United States Patent
Klejsa et al.

(10) Patent No.: US 11,201,901 B2
(45) Date of Patent: Dec. 14, 2021

(54) METHODS AND SYSTEMS FOR STREAMING MEDIA DATA OVER A CONTENT DELIVERY NETWORK

(71) Applicant: DOLBY INTERNATIONAL AB, Amsterdam Zuidoost (NL)

(72) Inventors: Janusz Klejsa, Solna (SE); Heiko Purnhagen, Sundbyberg (SE)

(73) Assignee: Dolby International AB, Amsterdam Zuidoost (NL)

(*) Notice: Subject to any disclaimer, the term of this patent is extended or adjusted under 35 U.S.C. 154(b) by 0 days.

(21) Appl. No.: 17/051,768

(22) PCT Filed: Apr. 29, 2019

(86) PCT No.: PCT/EP2019/060919
§ 371 (c)(1),
(2) Date: Oct. 29, 2020

(87) PCT Pub. No.: WO2019/211237
PCT Pub. Date: Nov. 7, 2019

(65) Prior Publication Data
US 2021/0144189 A1 May 13, 2021

Related U.S. Application Data

(60) Provisional application No. 62/664,369, filed on Apr. 30, 2018.

(30) Foreign Application Priority Data
Apr. 30, 2018 (EP) ..................................... 18170085

(51) Int. Cl.
*H04L 29/06* (2006.01)
*H04L 12/911* (2013.01)

(52) U.S. Cl.
CPC ............ *H04L 65/60* (2013.01); *H04L 47/827* (2013.01); *H04L 65/80* (2013.01)

(58) Field of Classification Search
CPC ........ H04L 65/60; H04L 65/80; H04L 47/827
(Continued)

(56) References Cited

U.S. PATENT DOCUMENTS 7,430,187 B2 * 9/2008 Holt ........................ G07F 17/32
345/619
7,467,220 B2 * 12/2008 del Val .................. H04L 47/724
709/231

(Continued)

FOREIGN PATENT DOCUMENTS

CN 103491457 1/2014
CN 105264826 B 1/2016

OTHER PUBLICATIONS

Boyd, S. et al "Distributed optimization and statistical learning via the alternating direction method of multipliers." Foundations and Trends® in Machine Learning 3.1 (2011): 1-122.

(Continued)

*Primary Examiner* — Zi Ye

(57) ABSTRACT

The present document describes a method (900) for establishing control information for a control policy of a client (102) for streaming data (103) from at least one server (101, 701). The method (900) comprises performing (901) a message passing process between a server agent of the server (101, 701) and a client agent of the client (102), in order to iteratively establish control information. Furthermore, the method (900) comprises generating (902) a convergence event for the message passing process to indicate that the control information has been established.

9 Claims, 11 Drawing Sheets

(58) Field of Classification Search
USPC .......................................................... 709/219
See application file for complete search history.

(56) References Cited

U.S. PATENT DOCUMENTS

| | | |
|---|---|---|
| 7,779,096 B2 | 8/2010 | Cherkasova |
| 9,110,931 B2 | 8/2015 | Prince |
| 9,641,579 B2 | 5/2017 | Gouache |
| 2016/0142510 A1 | 5/2016 | Westphal |
| 2016/0337426 A1 | 11/2016 | Shribman |
| 2017/0070758 A1 | 3/2017 | Phillips |

OTHER PUBLICATIONS

Do, C.T. et al "A Proximal Algorithm for Joint Resource Allocation and Minimizing Carbon Footprint in Geo-Distributed Fog Computing" IEEE International Conference on Information Networking, pp. 324-329, Jan. 12, 2015.

Gibbon, D. et al "Automated Content Metadata Extraction Services based on MPEG Standards".

Niu, D. et al "An Asynchronous Fixed-Point Algorithm for Resouice Sharing with Coupled Objectives" IEEE/ACM Transactions on Networking, vol. 24, No. 5, Oct. 2016, pp. 2593-2606.

Spiteri, K. et al. "BOLA: near-optimal bitrate adaptation for online videos." Computer Communications, IEEE INFOCOM 2016—The 35th Annual IEEE International Conference on. IEEE, 2016.

Xu, H. et al "Joint Request Mapping and Response Routing for Geo-Distributed Cloud Services" IEEE Infocom, Apr. 14, 2013, pp. 854-862.

\* cited by examiner

METHODS AND SYSTEMS FOR STREAMING MEDIA DATA OVER A CONTENT DELIVERY NETWORK

CROSS-REFERENCE TO RELATED APPLICATIONS

This application is the U.S. National Stage of International Patent Application No. PCT/EP2019/060919 filed 29 Apr. 2019, which claims priority to U.S. provisional application 62/664,369 filed 30 Apr. 2018 and EP application 18170085.7 filed 30 Apr. 2018, which are hereby incorporated by reference.

TECHNICAL FIELD

The present document relates to the streaming of media data, e.g. video audio data, over a content delivery network (CDN) with limited resources.

BACKGROUND

Today users may stream media data, such as video and/or audio data, from one or more content servers through one or more telecommunication networks onto their end devices, such as smartphones or TV sets. The quality of experience (QoE) of the users typically depends on the streaming related resources which are available for each individual data stream. Insufficient resources may lead to interruptions and/or deteriorations of the rendered media data.

In Niu Di and Baochun Li: "An Asynchronous Fixed-Point Algorithm for Resource Sharing With Coupled Objectives" IEEE/ACM Transactions on Networking 24 (2016): 2593-2606, a utility maximization problem with the objective being the sum of user utilities minus a coupled cost is addressed. A new fixed-point-like distributed solution to resource sharing problems with coupled objective functions is proposed. Cuong Do et al. "A Proximal Algorithm for Joint Resource Allocation and Minimizing Carbon Footprint in Geo-distributed Fog Computing", 2015 International Conference on information networking ICOIN, IEEE, 12 Jan. 2015, pages 324-329, considers the emerging problem of joint resource allocation and minimizing carbon footprint problem for video streaming service in Fog computing. To solve the largescale optimization problem, a distributed algorithm based on the proximal algorithm and alternating direction method of multipliers (ADMM) is proposed.

Xu, Hong and Baochun Li: "Joint request mapping and response routing for geo-distributed cloud services" 2013 Proceedings IEEE INFOCOM (2013): 854-862, addresses the problem of joint request mapping and response routing with distributed datacenters. The problem is formulated as a general workload management optimization. A utility function is used to capture performance goals, and the location diversity of electricity and bandwidth costs are realistically modeled. To solve the large-scale optimization, a distributed algorithm is developed based on the alternating direction method of multipliers (ADMM). Following a decomposition-coordination approach, the presented algorithm allows for a parallel implementation in a datacenter where each server solves a small sub-problem.

The present document addresses the technical problem of increasing the QoE for users of one or more content delivery networks in an efficient and reliable manner.

SUMMARY

According to an aspect, a method for establishing control information for a control policy of a client for streaming data from at least one server is described. The method may be performed by a client agent acting on behalf of the client and/or by a server agent acting on behalf of the server. The server agent may be separate from or identical with the server. In a similar manner, the client agent may be separate from or identical with the client. A client may be an end device and/or a software application (e.g. a media player software) which is configured to render media (e.g. audio and/or video). A client agent may be a software module (e.g. on the end device and/or within the software application), which is configured to perform the message passing process described in the present document. In a similar manner, a server may be a hardware device and/or a software application which is configured to stream media data to one or more clients. A server agent may be a software module (e.g. running on the hardware device and/or within the software application), which is configured to perform the message passing process described in the present document.

The method comprises performing a message passing process between the server agent of the server and the client agent of the client, in order to iteratively establish the control information. In the context of the message passing process a message (e.g. with server metadata) may be sent from the server agent to the client agent. In reaction to this, a message (e.g. with client metadata) may be sent from the client agent to the server agent. This exchange of messages (with iteratively updated content) may be repeated until a convergence event occurs. Furthermore, once the convergence event occurs, the message passing process may be restarted, in order to update the control information and/or to generate a subsequent convergence event. In other words, the message passing process may be repeated, in order to update control information. Hence, the control information may remain valid only for a limited time.

Furthermore, the method comprises generating a convergence event for the message passing process to indicate that the control information has been established. Generating the convergence event may comprise: determining that a pre-determined maximum number of iterations of the message passing process has been reached; determining that a change of the control information between two successive iterations of the message passing process is equal to or smaller than a pre-determined change-threshold; and/or determining that the client agent and/or the server agent have sent an indication for terminating the message passing process.

The established control information may then be used for controlling the data that is streamed from the server to the client. For this purpose, the method may comprise generating (e.g. performed by the client) a request for data based on the established control information. Alternatively or in addition, the method may comprise managing (e.g. performed by the client) a buffer of the client for buffering data based on the established control information. Alternatively or in addition, the method may comprise selecting (e.g. performed by the client) a quality level out of a plurality of different quality levels of content to be streamed. Typically, the different quality levels may be associated with different amount of resources (e.g., bandwidth) required to convey a particular quality level. The control policy of the client may be directed at generating a request for data, at managing a buffer and/or at selecting a quality level for the streamed data.

Hence, a method is described which enables one or more clients and one or more servers to establish control information for controlling one or more data streaming processes in an efficient and reliable manner In the context of the message passing process, an overall optimization criterium for the one or more data streaming processes may be improved, notably optimized, by an iterative exchange of messages between the one or more servers and the one or more clients. In particular, the message passing process may be used to perform a distributed optimization of an overall optimization criterium. The overall optimization criterium may be directed at distributing a total quantity of a resource, which is available for streaming, to one or more clients. In particular, the distribution may be performed such that the average utility for the one or more clients in the context of the data streaming process is increased, notably maximized.

The resource, which may be assigned or allocated to one or more clients within the method described herein may be one or more of: a (limited) bit-rate for streaming data; a (limited) processing capacity of the server for providing data; and/or a (limited) bandwidth of a transmission network between the server and the client. In the context of the message passing process, it may be established, which fraction of the total quantity of the resource is assigned to each one of the one or more clients for streaming data. In particular, the established control information for a client/server-pair may be indicative of or may comprise a quantity of the resource that has been allocated or assigned to the client for streaming data from the server of the client/server-pair.

The message passing process may comprise, within a given iteration k, sending server metadata from the server agent to the client agent. The server metadata at the given iteration k may depend on client metadata sent from the client agent to the server agent at a previous iteration (e.g. iteration k−1). Furthermore, the message passing process may comprise, within the given iteration k, sending client metadata from the client agent to the server agent. The client metadata at the given iteration k may depend on the server metadata sent from the server agent to the client agent at the given iteration k. Hence, in the context of the message passing process, messages may be exchanged between a server agent and a client agent, wherein the exchanged messages may be interdependent on one another (i.e. a message sent by the server agent may be dependent on a message received from the client agent; and/or a message sent by the client agent may be dependent on a message received from the server agent). The iterative exchange of interdependent messages may be used to establish optimized control information in a time efficient manner (with a relatively low number of iterations).

The method may comprise determining client metadata based on a client utility function. In particular, the method may comprise determining a requested quantity or quantity level of the resource (e.g., bandwidth, bit-rate, etc.), which is requested by the client, based on the client utility function. The client metadata may then be indicative of the requested quantity of the resource. The client utility function may describe the utility (e.g. the benefit or the Quality of Experience) for the client in the context of the streaming process. In particular, the client utility function may indicate the utility for the client of the streamed data received by the client, as a function of the quantity of the resource (e.g., bandwidth, bit-rate, etc.) that has been allocated to the client for streaming data. In other words, the client utility function may indicate how the utility for the client changes as the allocated quantity of the resource changes. Typically, it is an objective of content delivery to increase the utility of a client (e.g. in order to increase the QoE).

In particular, the client utility function may be indicative of and/or dependent on a perceptual quality of streamed media data rendered by the client. Alternatively or in addition, the client utility function may be indicative of and/or dependent on a quality-rate function. Alternatively or in addition, the client utility function may be indicative of and/or dependent on a signal-to-noise ratio of streamed data received and/or rendered by the client (e.g., the Peak Signal to Noise Ratio (PSNR)). Alternatively or in addition, the client utility function may be dependent on a rendering mode of the client (example rendering modes are rendering via a high definition or a low definition rendering device, rendering mono-, two- or multi-channel audio content, rendering over loudspeakers or headphones, etc.). Alternatively or in addition, the client utility function may be dependent on a rendering environment of the client (e.g. rendering content within a home cinema or within public transportation; and/or a noise level of the rendering environment). Alternatively or in addition, the client utility function may be dependent on a type of the client (e.g. a smartphone, a PC, a laptop, a TV set, loudspeakers, headphones, etc.). Alternatively or in addition, the client utility function may depend on the perceptual and/or statistical characteristic of the streamed content. For example, a particular codec used to code the streamed material may perform better on some type of content than on others, while operating at exactly the same bit-rate. Therefore, a particular quality vs. rate characteristic may be associated with a specific type of content. Hence, the client utility function may be dependent on the type of content (e.g. a cartoon or a real-life movie) that is to be streamed and/or on the codec which is used for encoding the streamed data. A particular type of content may be associated with a particular quality-to-rate curve. This curve may be signaled to the client agent and may be used as part of the client utility function. The client utility function may be time-variant, i.e. the client utility function may change over time.

By taking into account a client utility function, the method is enabled to improve (notably to maximize or to optimize) the overall utility for one or more clients in the context of streaming data. Due to the use of a message passing process, the client utility function does not have to be known by the server or by an overall agent. The client utility function of a particular client may only be known to the client agent of the particular client. It may not be known to other clients or servers. Nevertheless, the overall utility for one or more clients may be improved, by taking into account the client utility function of a particular client when generating the message (notably the client metadata) which is sent by the client agent of the particular client. By doing this, content distribution to a large number of clients may be optimized in an efficient and flexible manner.

The server metadata may be indicative of an allocated quantity of the resource, which is allocated to the client for streaming data. The method may comprise determining the requested quantity of the resource, which is requested by the client, in dependence of the allocated quantity of the resource. In other words, a client agent may be informed in the context of the message passing process, about the allocated quantity of the resource that the server is willing to allocate to the client for streaming data. The client agent may use this information for updating its request for the resource, i.e. for updating the requested quantity of the resource. Furthermore, the client agent may make use of the client utility function. By doing this, an optimized agreement on the allocated quantity of the resource may be established in an iterative and efficient manner.

The requested quantity of the resource may be determined based on, notably by reducing or minimizing, a cost function. The cost function may comprise a first term which is indicative of (e.g. the absolute value and/or the square of) the deviation of the requested quantity of the resource from the allocated quantity of the resource. Furthermore, the cost function may comprise a second term which comprises or which is indicative of a complement of the client utility function. The complement of the client utility function may be derived from the client utility function by offsetting and/or by changing the sign of the client utility function. In particular, the complement of the client utility function may be such that minimizing the complement of the client utility function corresponds to or is equal to maximizing the client utility function (or vice versa).

In particular, the cost function may comprise a weighted sum of the first term and the second term. An example for a cost function of a client is described in the present document (for the case of one server and for the case of M servers). By way of example, the cost function may comprise the expression $$d_n(r) + \frac{\rho_n}{2} \|r - z_n^{(k)} + u_n^{(k)}\|^2$$

wherein $d_n(r)$ is the complement of the client utility function, wherein r is the requested quantity of the resource that is to be determined, wherein $(z_n^{(k)} - u_n^{(k)})$ is related to the allocated quantity of the resource, and wherein $\rho_n$ is a weighting parameter. In particular, $z_n^{(k)}$ may indicate the allocated quantity of the resource (notably subject to occurrence of the convergence event), e.g. the established control information may be $r^* = z_n^{(k)}$. The client agent may be configured to improve, notably to minimize, the cost function in order to determine the requested quantity of the resource. This task may be performed during each iteration of the message passing process, in order to optimize an overall optimization criterium in an efficient and reliable manner.

As indicated above, the client metadata may be indicative of a requested quantity of the resource, which is requested by the client. The allocated quantity of the resource may be determined (by the server agent) based on the requested quantity of the resource. By doing this, an agreement of the allocated quantity of the resource may be established in the context of the message passing process.

The method may comprise determining (by the server agent) the server metadata in dependency of a total quantity of the resource, which is to be allocated to a plurality of clients for streaming data. As indicated above, the resource for streaming data may be limited (to a total quantity). The server metadata, which is sent to the client agent of a particular client, may be determined in dependence of this total quantity. In particular, the server metadata may be determined such that the allocated quantity of the resources to the one or more clients does not exceed the total quantity. As a result of this, a reliable distribution of the limited quantity of the resource may be achieved in the context of the message passing process.

The client may be referred to as a first or as a particular client of a plurality of clients. The plurality of clients may compete for the limited resource. The method may be directed at distributing the limited resource to the plurality of clients in order to improve, notably to optimize, an overall optimization criterium. The overall optimization criterium may correspond to or may comprise the (possibly different) client utility functions of the plurality of clients. In particular, the overall optimization criterium may be directed at improving, notably maximizing, the average value of the plurality of client utility functions of the corresponding plurality of clients. The server agent may not be aware of the client utility functions of the different clients. Nevertheless, an improvement, notably an optimization, of the overall optimization criterium may be achieved due to the use of a message passing process.

The method may comprise determining an allocated quantity of the resource, which is allocated to the first client for streaming data, based on the total quantity of the resource. The server metadata for the first client may then be indicative of the allocated quantity of the resource, which is allocated to the first client for streaming data. In particular, the method may comprise receiving client metadata from the plurality of clients (notably from the client agents of the plurality of clients) competing for the total quantity of the resource. The client metadata from each of the clients may indicate the requested quantity of the resource, which is requested by the respective client. The allocated quantity of the resource for the first client may then be determined based on the requested quantity of the resource from each of the plurality of clients. By doing this, an efficient and robust distribution of the total quantity of the resource for improving an overall optimization criterium may be achieved. In particular, such optimized distribution may be achieved, if the requested quantity of the resource from the different clients has been determined in dependence of the client utility function of the respective clients.

The method may comprise performing a (pairwise) message passing process between the server agent of the server and client agents of a plurality of clients, in order to iteratively establish control information for each of the plurality of clients. As indicated above, the plurality of clients may compete for the total quantity of a resource, which is available for streaming data from the server. The messages which are exchanged between the different server/client-pairs may comprise the information (notably the metadata) described in the present document. By performing a message passing process between different server/client-pairs an optimized distribution of the limited total quantity of the resource may be achieved in a reliable and efficient manner.

Alternatively or in addition, the method may comprise performing a (pairwise) message passing process between server agents of a plurality of servers and the client agent of one or more clients, in order to iteratively establish control information for control policies of the one or more clients for streaming data from each of the plurality of servers. In a general case, N clients, with N>1, e.g. N=10, 50, 100, 1000 or more, may be competing for the limited resources of M>0, e.g. M=1, 2, 3, 4, 5 or more, servers. A client may be configured to stream fractions of an overall content from different servers. The allocated quantity of the limited resource, which is assigned from each of the servers, may be established in an overall message passing process. A client may then stream different fractions of an overall media stream from the different servers based on the established control information for the different servers, respectively.

According to a further aspect, a method (e.g. performed by the server agent of a server) for establishing control information for a control policy of at least one client for streaming data from the server is described. The method may comprise any one or more of the features (notably any one or more of the server or server agent related features) described in the present document.

The method comprises receiving client metadata, wherein the client metadata is indicative of a requested quantity of a resource requested by the at least one client for streaming data from the server. Furthermore, the method comprises determining server metadata based on the received client metadata, wherein the server metadata is indicative of an allocated quantity of the resource allocated to the at least one client for streaming data from the server. In addition, the method comprises sending the server metadata. The receiving, determining and sending steps may be repeated until occurrence of a convergence event, wherein the convergence event indicates that control information for the control policy of the at least one client for streaming data from the server has been established based on the iterative receiving of client metadata and sending of server metadata.

According to another aspect, a method (e.g. performed by the client agent of a client) for establishing control information for a control policy of the client for streaming data from at least one server is described. The method may comprise any one or more of the features (notably any one or more of the client or client agent related features) described in the present document.

The method comprises receiving server metadata, wherein the server metadata is indicative of an allocated quantity of a resource allocated to the client for streaming data from the at least one server. In addition, the method comprises determining client metadata based on the server metadata, wherein the client metadata is indicative of a requested quantity of the resource requested by the client for streaming data from the at least one server. Furthermore, the method comprises sending the client metadata. The receiving, determining and sending steps may be repeated until occurrence of a convergence event, wherein the convergence event indicates that control information for the control policy of the client for streaming data from the at least one server has been established based on the iterative receiving of server metadata and sending of client metadata.

The method may comprise, repeatedly (e.g. periodically) determining updated control information using the receiving, determining, sending and repeating steps. In other words, the message passing process may be repeated (e.g. periodically with a frequency f=1/T) in order to determine updated control information. By doing this, changes within a content delivery network may be taken into account, thereby increasing the QoE of the one or more clients within the content delivery network.

The control information may e.g. be established at a first time instant. The control information may then exhibit a certain validity period (e.g. of T or more) starting from the first time instant. By defining a validity period for control information, changes within a content delivery network may be taken into account. The method may comprise, determining the control policy for streaming data based on the control information during the validity period of the control information. Furthermore, the method may comprises applying a control policy for streaming data which is independent of the control information, subsequent to the validity period of the control information. In other words, the use of the control information for the control policy of a client may be limited to a certain validity period. If no updated control information is established within the validity period, the client may switch to a locally optimized and/or individual control policy subsequent to the validity period. By doing this, a robust streaming scheme may be provided.

According to a further aspect, a system for delivering, notably for streaming, content is described. The system comprises at least one server configured to provide data for streaming content to one or more clients. Furthermore, the system comprises at least one client configured to request data for streaming content from the at least one server. In addition, the system comprises a server agent for the at least one server (e.g. as part of the server) and a client agent for the at least one client (e.g. as part of the client). The server agent and the client agent may be configured to perform a message passing process between the server agent and the client agent, in order to iteratively establish control information for a control policy of the at least one client for streaming data from the at least one server. Furthermore, the server agent and the client agent may be configured to generate a convergence event for the message passing process to indicate that the control information has been established.

According to another aspect, a server agent for a server of a content delivery network is described. The server agent is configured to receive client metadata, wherein the client metadata is indicative of a requested quantity of a resource requested by a client for streaming data from the server. Furthermore, the server agent is configured to determine server metadata based on the received client metadata, wherein the server metadata is indicative of an allocated quantity of the resource allocated to the client for streaming data from the server. In addition, the server agent is configured to send the server metadata. The server agent is further configured to repeat receiving, determining and sending until occurrence of a convergence event. The convergence event may indicate that control information for a control policy of the client for streaming data from the server has been established based on the iterative receiving of client metadata and sending of server metadata.

It should be noted that the server agent may be located at a different network location than the actual server or servers which store the content. By way of example, the server agent may be service provided by a cloud. The server agent may be informed regarding the available quantity of the limited resource (e.g. the size of a bottleneck). The server agent may then perform the message passing process described herein. The content may be located on more than one server, and the server agent may act on behalf of a set or a plurality of servers.

According to a further aspect, a client agent for a client of a content delivery network is described. The client agent is configured to receive server metadata, wherein the server metadata is indicative of an allocated quantity of a resource allocated to the client for streaming data from a server. Furthermore, the client agent is configured to determine client metadata based on the server metadata, wherein the client metadata is indicative of a requested quantity of the resource requested by the client for streaming data from the server. In addition, the client agent is configured to send the client metadata. The client agent is further configured to repeat receiving, determining and sending until occurrence of a convergence event. The convergence event may indicate that control information for a control policy of the client for streaming data from the server has been established based on the iterative receiving of server metadata and sending of client metadata.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

The invention is explained below in an exemplary manner with reference to the accompanying drawings, wherein FIG. 1 shows a block diagram of an example content delivery network;

DETAILED DESCRIPTION

Figure 1:
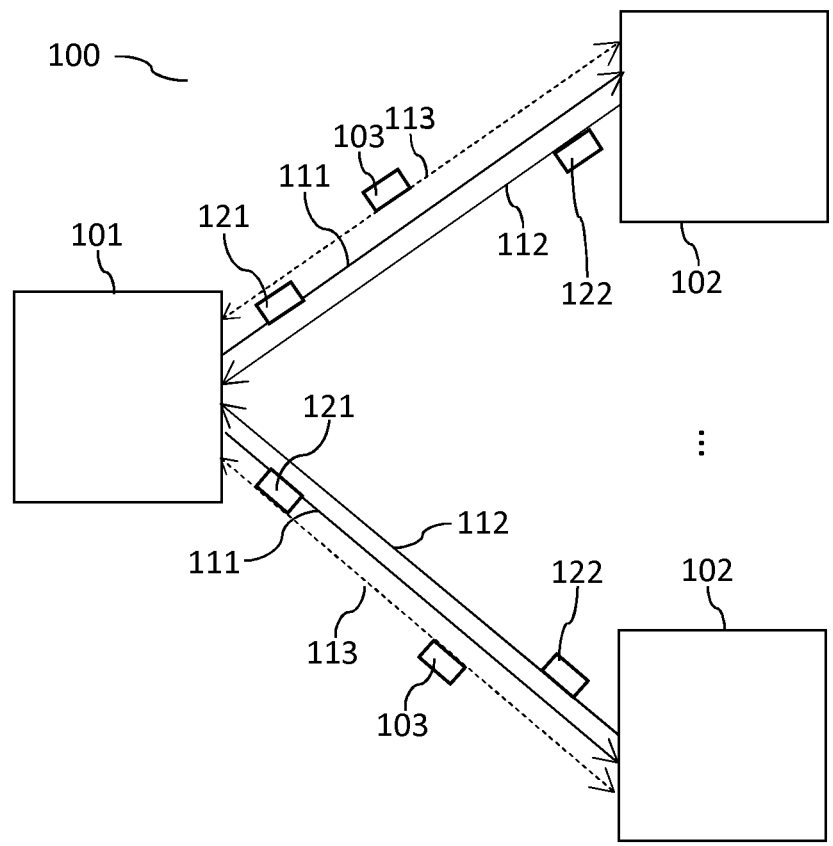

As outlined above, the present document addresses the technical problem of increasing the QoE for streaming data within a content delivery network. In particular, the present document is directed at increasing the average QoE for a plurality of clients within a content delivery network. In this context, FIG. 1 shows a block diagram of a content delivery network 100 which comprises a server 101 and a plurality of clients 102. The server 101 is configured to send an individual data stream or an individual stream of data 103 (e.g. an audio and/or video data stream) to each of the clients 102.

The present document is directed at providing an optimized trade-off between the allocation of (network) resources of the CDN 100 (notably of the resources of the server 101 and/or the resources of a transmission network between the server 101 and the one or more clients 102) and the resulting quality of experience (QoE) for the users of the clients 102. In this context, feedback channels 111, 112 may be provided to facilitate iterative metadata exchange between the server 101 and the clients 102, wherein the feedback channels 111, 112 are provided in parallel to the streaming channel 113 for the multimedia streaming process. The metadata exchange via the feedback channels 111, 112 may be used to facilitate global and/or overall optimization of the streaming process, and may be used, for instance, to reduce or to eliminate client competition for the finite (network) resources of the CDN 100. The metadata exchange process may generate dynamic side or control information for each client 102, wherein the side or control information may be used to adjust the local policy governing the streaming process at each client 102.

Each client 102 may update and/or generate its client metadata 122 (to be send over the client feedback channel 112) based on the server metadata 121 received from the server 101 (over the server feedback channel 111). Furthermore, the client metadata 122 may be updated and/or generated based on a local client utility or cost function of the client 102. Subsequent to generating and/or updating the client metadata 122, the client 102 may transmit the (updated) client metadata 122 to the one or more servers 101 that the client 102 is connected to for streaming data, via the corresponding one or more client feedback channels 112.

The server 101 may collect at least a subset of the client metadata 122 received from the clients 102 that are served by the server 101. Furthermore, the server 101 may generate and/or update server metadata 121 based on the received client metadata 122 and/or based on a local server utility or cost function. The generated and/or updated server metadata 121 may then be sent to at least a subset of the clients 102, via the one or more server feedback channels 111. This process of exchanging and updating metadata 121, 122 may be repeated iteratively and/or periodically. The updates of metadata 121, 122 may be transmitted in a synchronous or an asynchronous manner Each client 102 may be configured to update its request for new content from the server 101 based on the received server metadata 111 and/or based on its local utility or cost function. In particular, the request for new content may be performed in dependence of side or control information that has been established in the context of the iterative message passing process (subject to occurrence of a convergence event of the iterative message passing process).

The exchange of metadata 121, 122 via feedback channels 111, 112 provides an algorithmic solution for a decentralized control scheme for a streaming scenario (e.g., for progressive streaming). The scheme described herein facilitates the decision of a client 102 to request content at a specific rate and/or at a specific quality level.

In case of limited resources of the CDN 100 (e.g., due to a transmission bottleneck), the clients 102 are forced to compete for the limited resources. The client competition may result in an unfair resource allocation, or in instable QoE. These issues may be addressed by a centralized control scheme that collects requests from the clients 102, that analyzes the operation of the clients 102 and then provides the clients 102 with optimal resource allocation. However, if content distribution occurs at a large scale, a centralized solution is typically not feasible (in view of computational complexity and/or in view of dynamic changes within a CDN 100 and/or within the different clients 102). The (continuous and/or repeated) exchange of metadata 121, 122 between a server 101 and the clients 102 provides a robust and efficient resource allocation scheme for a CDN 100 that comprises servers and/or a high number and/or servers a high number of clients 102.

Figure 4A:
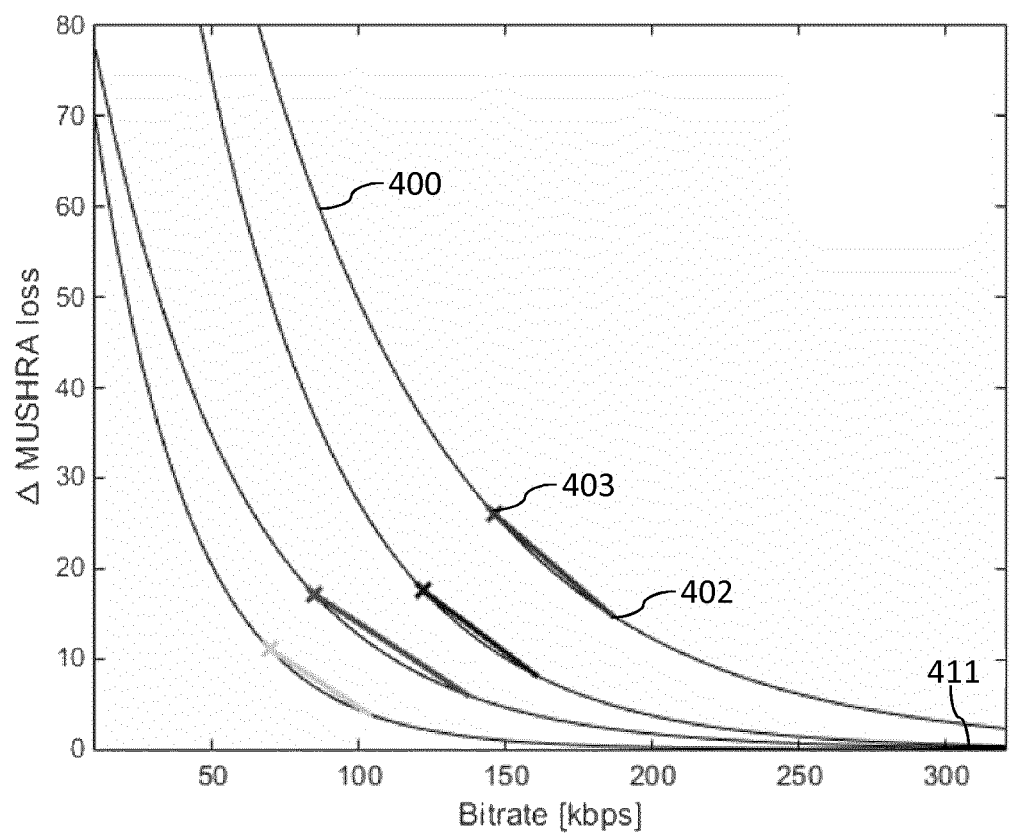
FIG. 4a shows example client cost functions.
Figure 4B:
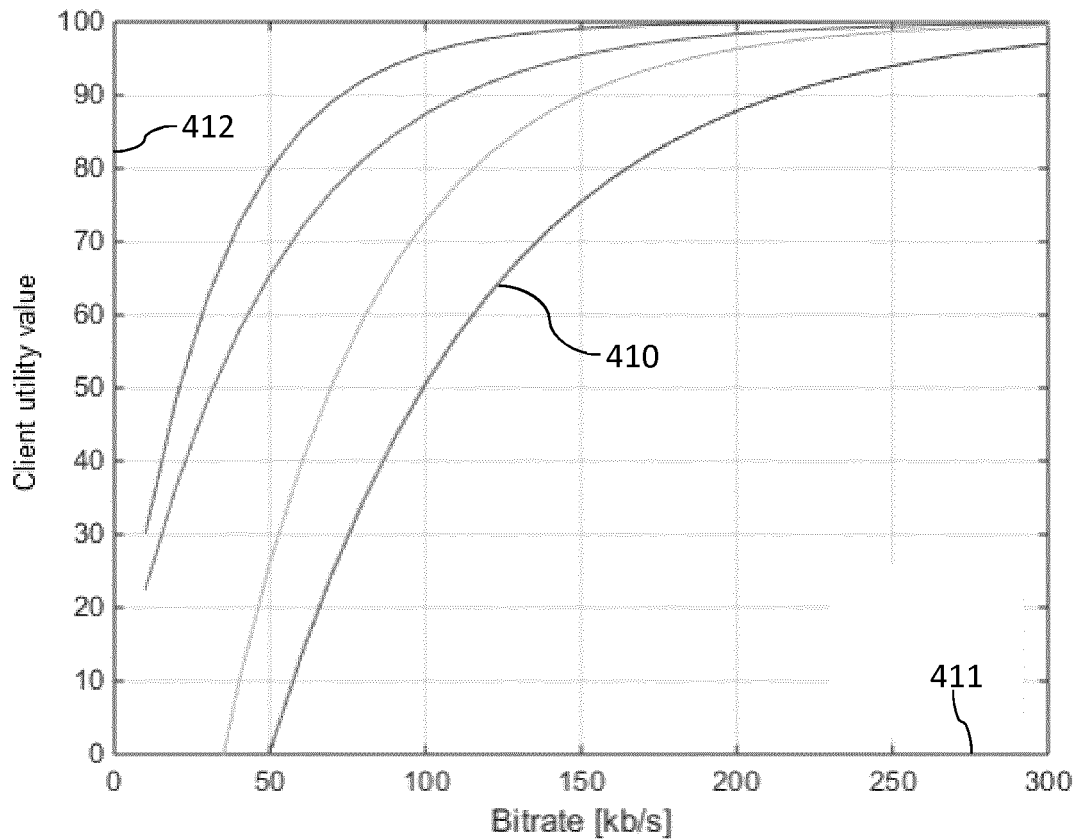
FIG. 4b shows example client utility functions.

The client utility functions which may be used by the clients 102 to generate the client metadata 122 may be individual and/or different for each client 102. The client utility function of a client 102 may be configured to capture and/or quantify the QoE of the client 102. The client utility functions of the different clients 102 may be designed such that the QoE can be compared among the different clients 102. In particular, the client utility functions may make use of a common criteria for measuring QoE. An example of such a client utility function (in the context of audio streaming) is the MUSHRA (MUltiple Stimuli with Hidden Reference and Anchor) score, as a function of bit-rate (wherein the total bit-rate is the limited resource). FIG. 4a shows example client cost functions 400 for different clients 102. The cost functions 400 indicate the MUSHRA loss as a function of the bit rate. FIG. 4b illustrates corresponding client utility functions 410, which indicate the utility 412 for a client 102 as a function of the bit-rate 411. The client cost function 400 may be considered to be the complement of the corresponding client utility function 410.

The cost or utility functions 400, 410 for the clients 102 may depend on the content type that is streamed and/or rendered, on the codec that is used, on the playout or rendering scheme, on the listening conditions and/or on the priority of a client 102. Cost or utility functions 400, 410 may be provided e.g. for video and/or audio content. As such, a cost or utility function 400, 410 for a client 102 may indicate a level of QoE as a function of the bit rate 411 and/or of another resource. Differences in the value of utility functions 410 of different clients 102 may indicate that a particular change of the bit rate 411 and/or the resource may have a different impact on the level of QoE for the different clients 102. This is illustrated by the points 402, 403 in FIG. 4a. It can be seen that the increase in MUSHRA loss which is caused by a certain decrease in bit-rate 411 may be different for different cost functions 400, i.e. for different clients 102. The schemes outlined in the present document may be directed at maximizing the average level of QoE for the different clients 102 of a CDN 100, given a limited quantity of overall network resources.

Hence, a decentralized control scheme for a massive streaming scenario is described, in order to improve the trade-off between allocation of the limited resources of a CDN 100 among the clients 102 of the CDN 100 and the resulting QoE for these clients 102. Such a technical problem may be viewed as a distributed optimization problem. To facilitate distributed optimization, a metadata exchange scheme may be used, wherein the metadata exchange between the one or more servers 101 and the one or more clients 102 occurs in parallel to the actual streaming processes towards the one or more clients 102. The metadata exchange scheme allows performing message passing which is a component of a distributed optimization scheme. In addition to the messages of the distributed optimization scheme, the metadata 121, 122 exchanged between the one or more servers 102 and the one or more clients 102 may include additional parameters that govern convergence speed and/or adaptivity of the optimization algorithm.

In view of the fact that the client utility functions 410 of the one or more clients 102 are typically non-linear functions, linear programming cannot be used for solving the resource allocation problem. On the other hand, a distributed optimization scheme, such as the Alternating Direction Method of Multipliers scheme, may be used for determining an (optimal) solution of the resource allocation problem, based on message passing, i.e. based on the exchange of metadata 121, 122. It should be noted that the aspects outlined in the present document may also be applied to cross-CDN optimization (e.g., in case that network coding is used to implement simultaneous streaming of data 103 for a client 102 from multiple servers 101).

The total resource (e.g. bit-rate) available within a CDN 100 may be $r_{total}$. The total resource has to be shared among N client 102 n=1, ..., N. The allocated quantity of the resource for each client n may be denoted as $r_n$. Hence, the overall optimization problem to be solved is $$\underset{(r_1,\ldots,r_N)}{\text{minimize}} \sum_{n=1}^{N} d_n(r_n)$$

$$\text{subject to } \sum_{n=1}^{N} r_n \leq r_{total}, \; r_n \geq 0, n = 1, \ldots, N$$

wherein $d_n(r_n)$ is the client cost function 400 of client n, e.g. a rate-distortion function such as $d_n(r_n)=\alpha_n e^{-\beta_n r_n}$, with $\alpha_n$ and $\beta_n$ being positive parameters that may be different for each client 102.

It can be shown that the above optimization problem can be reformulated to provide $$\text{minimize } \Sigma_{n=1}^{N} d_n(r_n) + g(\Sigma_{n=1}^{N} z_n)$$

$$\text{subject to } r_n = z_n, n=1, \ldots, N.$$

wherein g( ) is an indicator function given by $$g(s) = \begin{cases} 0 & \text{if } s \leq r_{total}, \\ \infty & \text{if } s > r_{total}. \end{cases}$$

The objective of minimizing the sum of the client cost functions $d_n(r_n)$ is separable into sub-problems that can be solved independently by each client 102 (using the respective client cost function). At a certain iteration k of the message passing process, a client n 102 may receive a message from the server 101 with server metadata 121, wherein the server metadata 121 comprises information regarding the allocated quantity of the resource $r_n^{(k)}$ that has been allocated to the client n. In particular, the server metadata 121 may comprise values $z_n^{(k)}$ and $u_n^{(k)}$, which in combination are indicative of the allocated quantity of the resource $r_n^{(k)}$. The client 102 may then solve the following optimization problem, in order to determine an updated request, i.e. an updated requested quantity of the resource $r_n^{(k+1)}$, $$r_n^{(k+1)} = \arg\min_{r}\left(d_n(r) + \frac{\rho}{2}\left\|r - z_n^{(k)} + u_n^{(k)}\right\|^2\right),$$

wherein ρ is a tunable parameter. Hence, the client 102 may determine an updated resource request which takes into account the client cost function 400 of the particular client 102 and which takes into account the resource allocation provided by the server 101. The updated resource request $r_n^{(k+1)}$ may then be provided within client metadata 122 to the server 101.

The server 101 receives the resource requests $r_n^{(k+1)}$ from the N clients 102 (wherein the resource requests of the different clients 102 depend on the client cost functions 400 of the different clients 102). Based on this information, the server 101 may update the resource allocation for the different clients 102.

$$z^{(k+1)} = \arg\min_z \left( g\left(\sum_{n=1}^{N} z_n\right) + \frac{\rho}{2}\sum_{n=1}^{N} \|z_n - u_n^{(k)} - r_n^{(k+1)}\|^2 \right),$$

$$u_n^{(k+1)} = u_n^{(k)} + r_n^{(k+1)} - z_n^{(k+1)}.$$

The values $z_n^{(k+1)}$ and $u_n^{(k+1)}$ may then be sent as server metadata 121 to the clients 102 (in order to indicate the updated allocated quantity of the resource). This process may be repeated iteratively, in order to provide an optimized resource allocation for the N clients 102, such that the overall cost $\Sigma_{n=1}^{N} d_n(r_n)$ of the plurality of clients 102 is minimized, i.e. such that the average QoE for the clients 102 is maximized.

It can be shown that the first equation of the optimization problem of the server 101 may be simplified to $$z_n^{(k+1)} = a_n + \bar{z} - \frac{1}{N}\sum_{n=1}^{N} a_n$$

wherein $\bar{z}=r_{total}/N$, and $a_n=u_n^{(k)}+r_n^{(k+1)}$, thereby further reducing the computational complexity of the scheme.

Figure 2B:
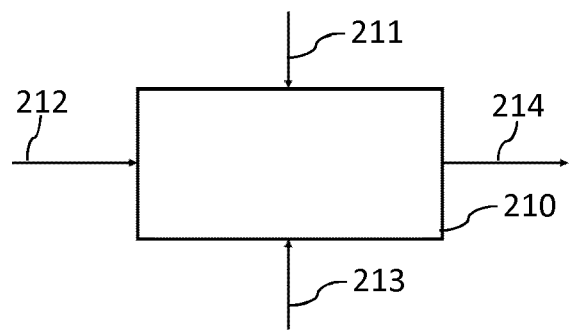
FIG. 2b shows a processing unit of a client.
Figure 2A:
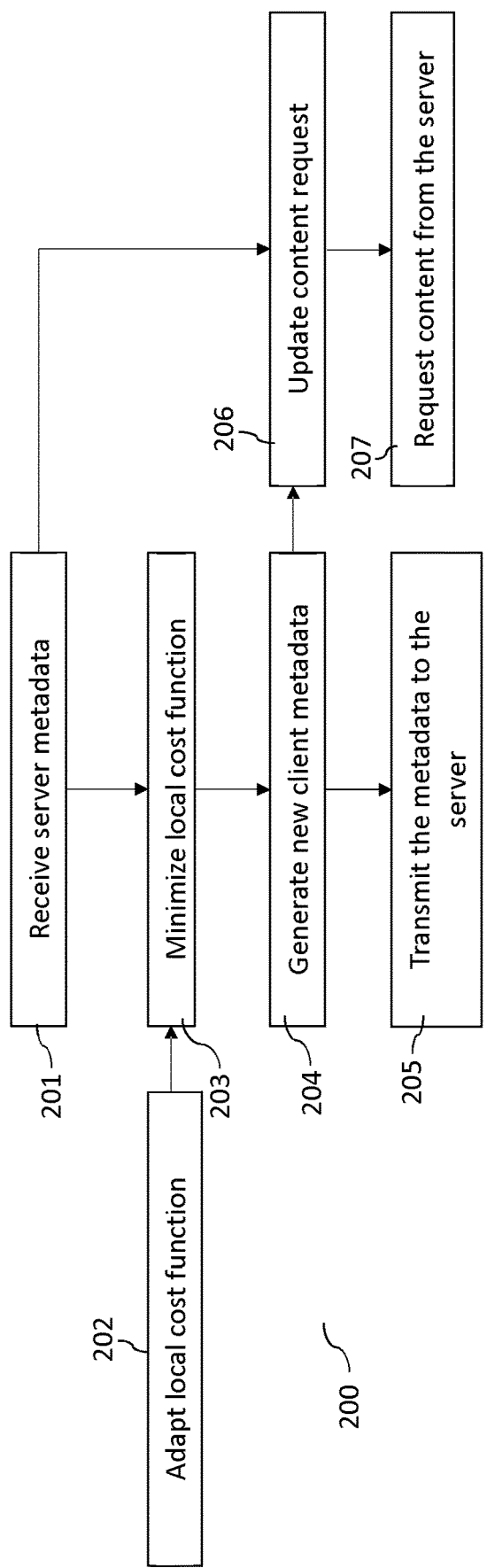
FIG. 2a shows a flow chart of an example method for streaming data performed by a client of a content delivery network.

FIG. 2a shows a flow chart of a method 200 performed by a client 102. The client 102 receives 201 server metadata 121 from a server 101. Optionally, the client 102 may update 202 its local client cost function 400. The client cost function 400 may be minimized 203 based on the received server metadata 121 and updated client metadata 122 may be generated 204. This may be achieved by using the above mentioned formula for the updated resource request $r_n^{(k+1)}$. The updated resource request $r_n^{(k+1)}$ may then be transmitted 205 to the server 101. Subject to convergence of the message passing scheme for establishing a resource allocation, the content request for streaming data may be updated 206 based on the received server metadata 121, notably based on the allocated resource $z_n^{(k)}, u_n^{(k)}$ indicated within the server metadata 121. Furthermore, streaming data 103 may be requested from the server 101 in accordance to the allocated resource (step 207).

Hence, a client 102 generates new client metadata 122 to be sent to the server 101 that is based on a local client cost function 400 and based on server metadata 121 received from the server 101. Furthermore, a client 102 comprises decision logic that is based on the received server metadata 121 and the newly generated client metadata 122 and that is used to trigger the actual request for content at a specific bitrate from the server 101 (e.g., upon observing convergence of the message passing process).

Each client 102, upon convergence of the message passing process, will be provided with side information r* (which is also referred to herein as control information) representing an allocated resource (notably an allocated bit-rate) leading to fair resource allocation in the CDN 100. Each client 102 will generate a request for a specific quantity of the resource (notably a specific bit-rate) that is based on a local client utility function 410 representing the QoE (e.g., a function representing the quality of playout as a function of bitrate, a function promoting smooth playout, or a combination of these functions), by observing its buffer state and by using the fair rate allocation r* (i.e. by using the established control information). An example of such policy can be derived by using a renewal system model with two queues: the first queue represents the playout process, and the second queue represents the deviation of the bit-rate selected by the client 102 and the recommended rate r* provided by the server 101. The policy can be derived by minimizing the Lyapunov drift for the request with a penalty term representing the QoE-related client utility function 410. A further example of such a policy may be achieved by limiting the maximum amount of resources that can be requested by the client such that r* is not exceeded for the client. In particular, such constraint may be combined with a policy aiming at local optimization of QoE.

FIG. 2b illustrates the processing 210 performed within a client 102 as part of a control policy for streaming data 103. The client 102 receives an indication 212 of a fair rate allocation (e.g. $z_n^{(k)}$ and $u_n^{(k)}$ subject to convergence) within the server metadata 121. Furthermore, the client 102 has access to a QoE function 211 (e.g. a client cost function 400 or a client utility function 410). In addition, the client 102 may have access to the state of its buffer 213 for buffering streaming data 103. Based on this information 212, 211, 213, an updated resource request 214 may be generated and may be provided to the server 101 within client metadata 122.

Figure 3A:
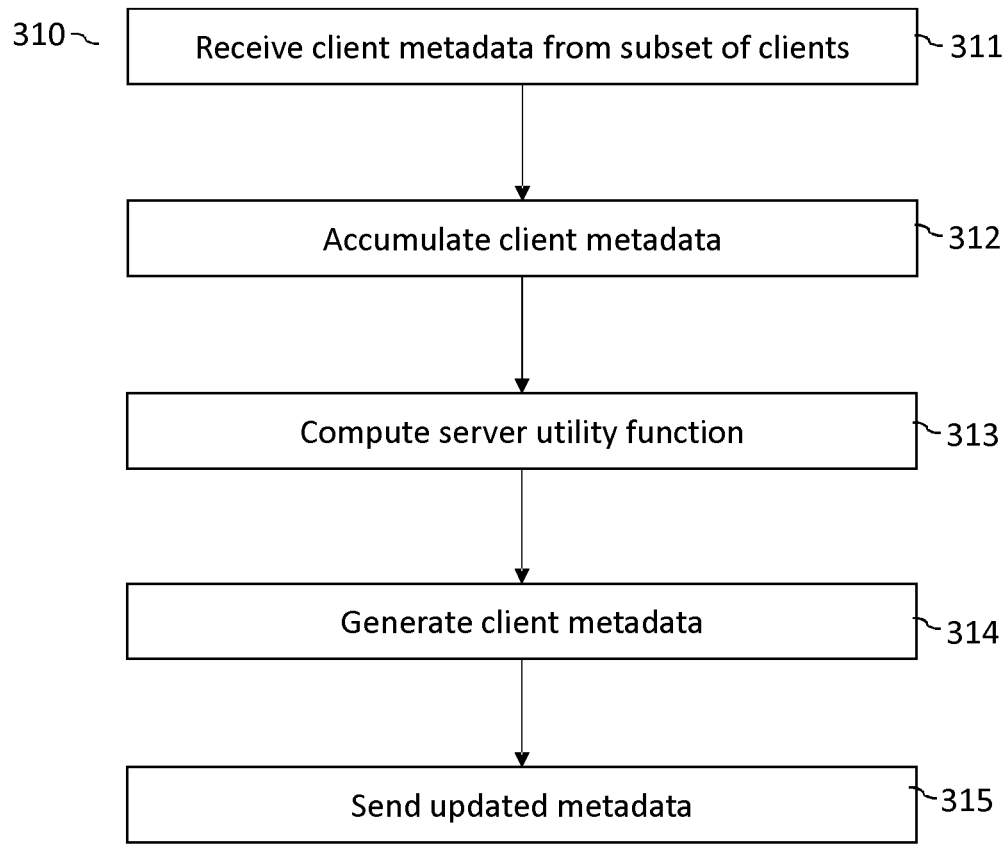
FIGS. 3a and 3b show flow charts of example methods for streaming data performed by a server of a content delivery network.
Figure 3B:
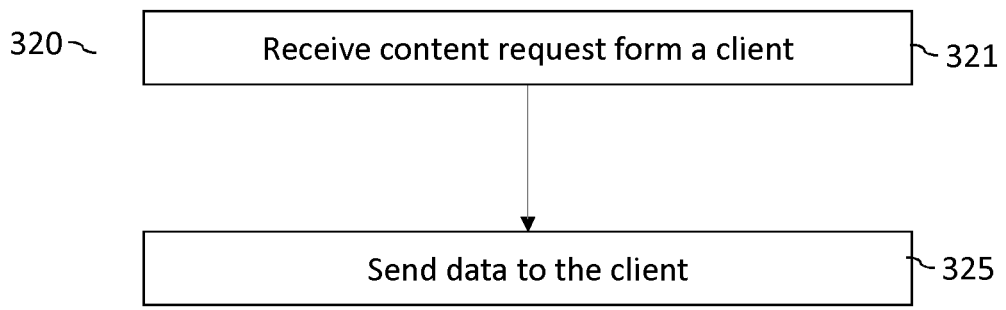

FIGS. 3a and 3b illustrate methods 310, 320 performed by a server 101. The method 310 is directed at generating server metadata 121 for the different clients 102. The method 320 is directed at providing content (media) data 103 to the different clients 102. Client metadata 122 is received 311 at least from a subset of clients 102. This client metadata 122 is accumulated 312. Furthermore, a server utility function is computed 313 and new server metadata 121 is generated 314, e.g. using the equations for $z_n^{(k+1)}$ and $u_n^{(k+1)}$ given above. The updated server metadata 121 may then be sent to the clients 102. Regarding the streaming process, an updated content request may be received 321 from a client 102 (e.g. indicating an updated bit-rate 411). Content data 103 may then be sent 325 to the client 102, based on the updated content request.

Hence, the server 101 collects all client metadata 122 (or a subset of metadata) from the clients 102 that are connected to the server 101 and solves an optimization problem based on its own utility function (e.g., representing the maximum allowed bitrate $r_{total}$ to be transmitted over the network 100, or considering the estimated bottleneck capacity to the clients 102). The solution of the optimization problem is used to generate new server metadata 121 that is transmitted to the clients 102 (or at least some of the clients 102). The method 310 is preferably designed in a way that the server optimization problem is computationally light. In addition, the server 101 provides access to the data 103 requested by the clients 102 (the streaming process operates in pull mode). In some embodiments, the service may operate on different machines or in different physical locations.

Figure 5A:
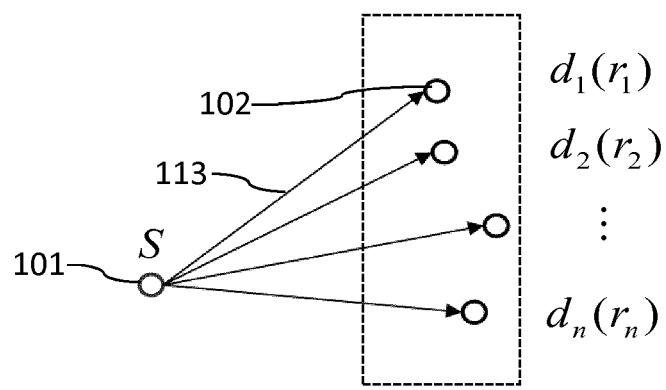
FIGS. 5a to 5c show example communication channels between a server and multiple clients.

FIG. 5a shows a streaming process comprising a single server 101 which provides streaming data 103 over streaming channels 113 to a plurality of clients 102. Each client 102 operates in a unicast setting. Each client 102 is characterized by its own client utility function 410. An example of such client utility function 410 in the context of streaming is a concave curve fitted to results of a MUSHRA test evaluating subjective performance of an audio codec as a function of the operating bit rate 411 (as illustrated in FIG. 4b). If the optimization is formulated as a minimization problem (as outlined above), the utility function 410 may be replaced by a corresponding cost or rate-distortion function $d_n(r_n)$ 400, which is preferably convex. The rate-distortion or cost function 400 may be obtained by inverting the sign of the utility function 410 and by offsetting the utility function 410. Furthermore, the rate-distortion or cost functions 400 of the different clients 102 may be weighted and/or an offset may be applied to facilitate comparison among the different rate-distortion or cost functions 400.

Figure 5B:
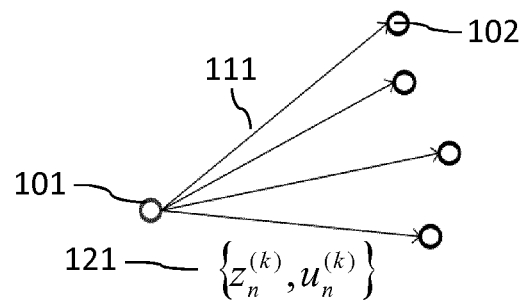
Figure 5C:
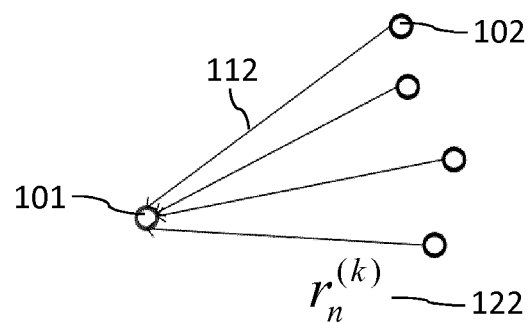

As outlined above and as shown in FIGS. 5b and 5c, server metadata 121 which is indicative of the allocated resource $z_n^{(k)}$, $u_n^{(k)}$ may be sent to the clients 102. On the other hand, updated resource request $r_n^{(k)}$ may be sent as client metadata 122 from the clients 102 to the (single) server 101. By iterating this exchange of metadata 121, 122, a converged resource allocation for the different clients 102 may be determined. It should be noted that each client 102 may be configured to detect whether the scheme has converged by evaluating convergence of the residual term $\|r-z_n^{(k)}+u_n^{(k)}\|^2$ when determining the updated resource request $r_n^{(k)}$. Alternatively or in addition, the convergence may be evaluated by observing convergence of all or some metadata variables exchanged in the message passing process (e.g. $r_n^{(k)}$ and $r_n^{(k+1)}$ may be compared). Alternatively or in addition, each client may assume convergence upon reaching a fixed number of iterations. Alternatively or in addition, the fact of convergence may be signaled from the server 101 during the process of exchanging the metadata 121, 122.

Figure 6A:
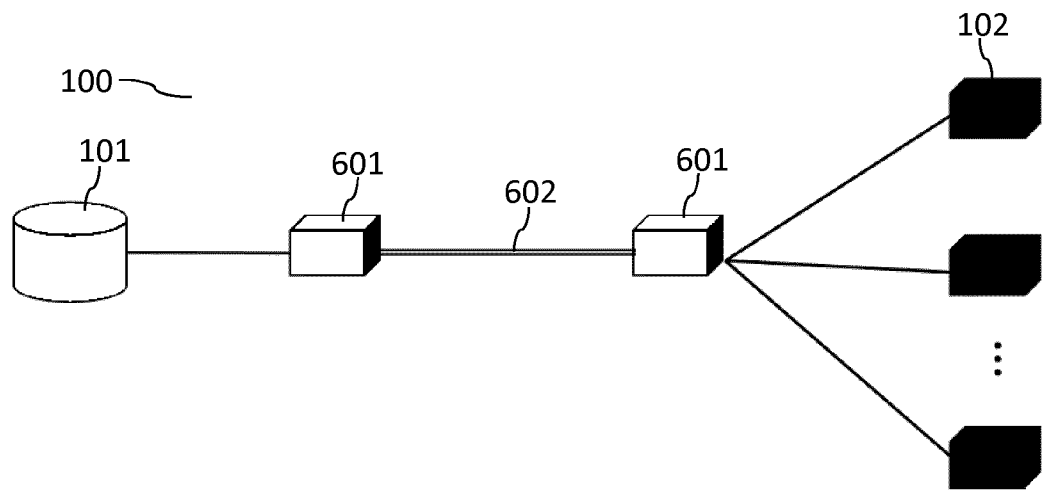
FIGS. 6a and 6b show example bottlenecks within a content delivery network.
Figure 6B:
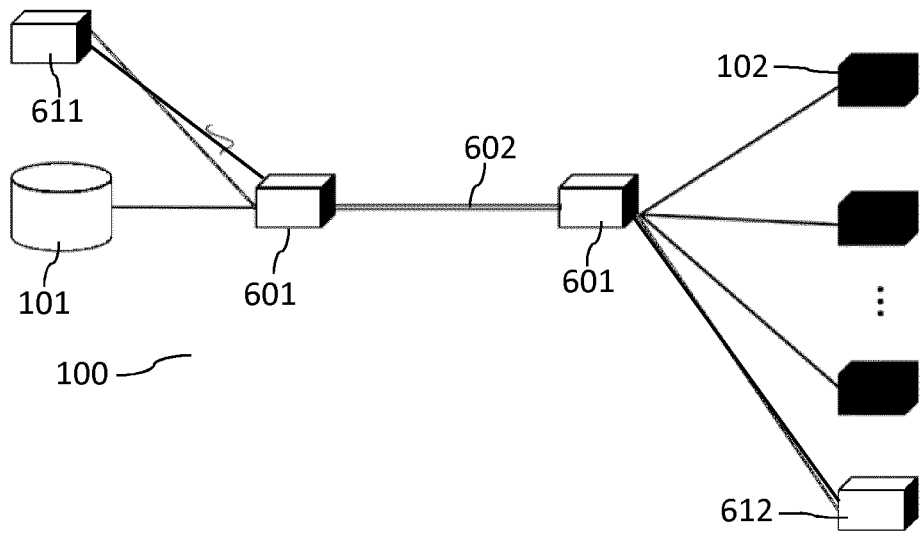

FIG. 6a shows a CDN 100 having a bottleneck 602 with a limited throughput between two transmission nodes 601. The limited throughput, i.e. a limited value for $r_{total}$, may be distributed among different clients 102. Alternatively or in addition, the number N of clients 102 that may be served by the server 101 may be adjusted, notably reduced. As shown in FIG. 6b, the limited throughput of a bottleneck 602 may also be caused by competing traffic between a source 611 and a sink 612.

Figure 7A:
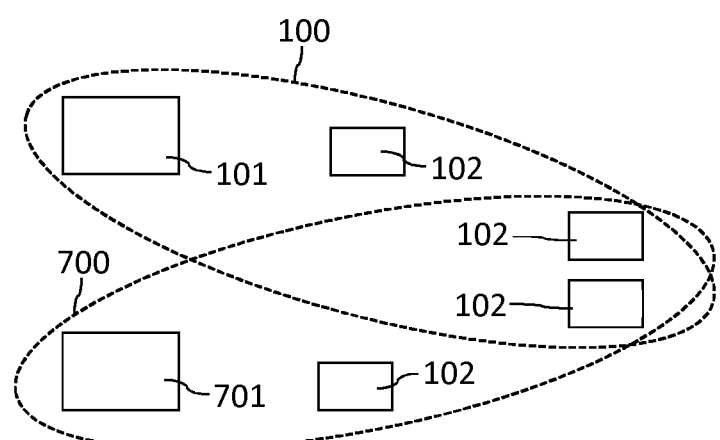
FIG. 7a shows multiple content delivery networks serving one or more joint clients.
Figure 7B:
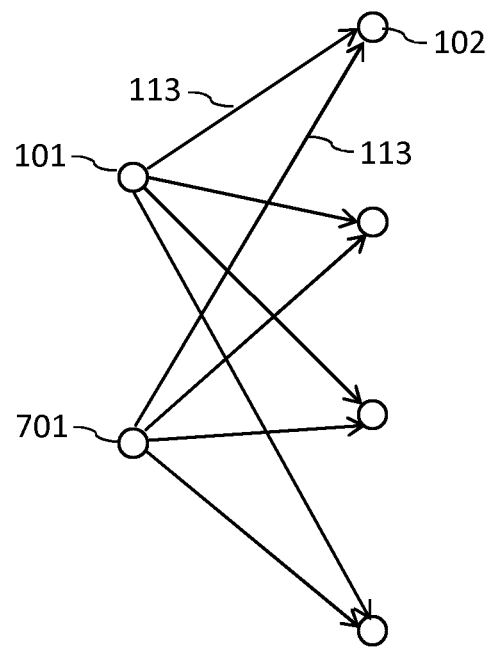
FIGS. 7b and 7c shows example communication channels for a message passing process in a multi-server scenario.
Figure 7C:
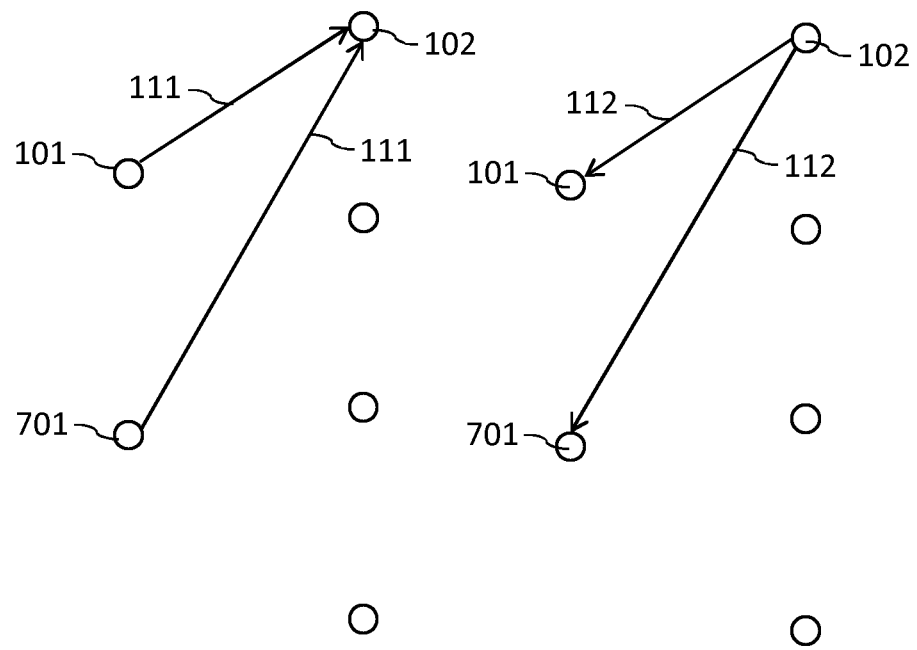

FIG. 7a shows a streaming scenario with a plurality of CDNs 100, 700. Each CDN 100 comprises at least one server 101, 701. One or more clients 102 may be part of a plurality of CDNs 100, 700 and may stream data 103 from a plurality of servers 101, 701 (as illustrated in FIG. 7b). In such a case, a client 102 may receive server metadata 121 from a plurality of servers 100, 700. Furthermore, a client 102 may send client metadata 122 to a plurality of servers 100, 700 (as illustrated in FIG. 7c).

In the following, a cooperative resource allocation for the multi-server streaming process shown in FIG. 7a is described. It is assumed that a client 102 can stream data 103 from M different servers 101, with M>1. $r_n$ is an M-dimensional vector which indicates the M allocated resource for streaming the data 103 provided by the M servers 101, respectively. $1^T$ is an M-dimensional vector with all ones. Then the cost or rate-distortion function 400 of a client 102 may be written as $$d_n(r_n) = \alpha_n \exp(-\beta_n 1^T r_n)$$

The overall optimization problem for all N clients 102 and for all M servers 101 may be written (in an analogous manner as outlined above), as minimize $\sum_{n=1}^{N} d_n(r_n) + \sum_{m=1}^{M} g_m(\sum_{n=1}^{N} [z_n]_m)$ subject to $r_n = z_n$.

wherein $[z_n]_m$ is the $m^{th}$ entry (for the $m^{th}$ server 101) of the M-dimensional resource-allocation vector $z_n$ for the $n^{th}$ client 102. The indication function $g_m( )$ for the $m^{th}$ server 101 may be defined as $$g_m(s) = \begin{cases} 0 & \text{if } s \leq r_{total}^{(m)}, \\ \infty & \text{if } s > r_{total}^{(m)}, \end{cases}$$

wherein $r_{total}^{(m)}$ is the total bitrate available for the $m^{th}$ server.

It can be shown that the above mentioned optimization problem may be solved using message passing between the clients 102 and the servers 101. Each client 102 may receive server metadata 121 from the servers 101, 701 m=1, . . . , M, wherein the server metadata 121 indicates the allocated quantity of the resource $[z_n]_m$ that has been allocated by the $m^{th}$ server 101, 701 to the $n^{th}$ client 102. Furthermore, the auxiliary variable $[u_m]_n$ may be indicated (as part of the allocated quantity of the resource). The client 102 may receive this data from all servers 101, 701 and based on this, the client 102 may generate updated resource requests for the M servers 101, 701.

Overall, N×M resource requests may be generated in case of N clients 102 and M servers 101, 701. These may be summarized within a matrix R with dimension N×M. The resource request of the $n^{th}$ client 102 towards the $m^{th}$ server 101, 701 may be written as the scalar $[R]_n^m$. The complete set of resource requests of the $n^{th}$ client 102 for all M servers 101, 701 may be written as the M-dimensional vector $r_n = [R]_n$. In a similar manner, the resource allocation of the M servers 101, 701 towards the N clients 102 may be written as an N×M dimensional Matrix Z, with $[Z]_n^m$ being the resource allocation of the $m^{th}$ server 101, 701 for the $n^{th}$ client 102, and with $[Z]^m$ being an N-dimensional vector comprising the resource allocation of the $m^{th}$ server 101, 701 for the N clients 102. $u_m$ may be an N-dimensional vector comprising the scalar auxiliary variables $[u_m]_n$ of the $m^{th}$ server 101, 701 for the N clients 102. Furthermore, a resource constraint function $G_m(z)$ may be defined for the $m^{th}$ server 101, 701, as $$G_m(z) = g_m\left(\sum_{n=1}^{N} z_n\right).$$

Using the above mentioned notation, the optimization problem to be solved by the $n^{th}$ client 102 in the $k^{th}$ iteration may be formulated as $$[R^{(k+1)}]_n = \arg\min_{[R]_n}\left(d_n([R]_n) + \sum_{m=1}^{M} \frac{\rho_m}{2}\|[R]_n^m - [Z^{(k)}]_n^m + [u_m^{(k)}]_n\|_2^2\right)$$

wherein $\rho_m$ is a design parameter. The updated resource requests $[R^{(k+1)}]_n^m$ may be sent within client metadata 122 from the $n^{th}$ client 102 to the $m^{th}$ server 101, 701.

The optimization problem to be solved by the $m^{th}$ server 101, 701 in the $k^{th}$ iteration may be formulated as $$[Z^{(k+1)}]^m = \arg\min_{[Z]^m}\left(G_m([Z]^m) + \frac{\rho_m}{2}\|[R]_n^m - [Z^{(k)}]^m + u_m^{(k)}\|_2^2\right)$$

with the auxiliary variable being updated according to $$u_m^{(k+1)} = u_m^{(k)} + [R^{(k+1)}]^m - [Z^{(k+1)}]^m$$

The updated resource allocation $[Z^{(k+1)}]_n^m$ as well as the updated auxiliary variable $[u_m^{(k+1)}]_n$ may be sent within server metadata 121 from the $m^{th}$ server 101, 701 to the $n^{th}$ client 102.

The above distributed optimization scheme may be iterated until a stop criterium is met (i.e. a convergence occurred). After convergence, the determined resource allocations may be used by each client 102 to make content requests to the different servers 101, 701.

Hence, performance (e.g. QoE) optimization may be performed across different CDNs 100, 700, wherein a CDN 100, 700 may be viewed as set of clients 102 streaming content 103 from a particular server 101, 701 and wherein each CDN 100, 700 may comprise a single server 101, 701. A (notably each) client 102 may be configured to participate in one or more CDNs 100, 700 (as illustrated in FIG. 7a).

Each client 102 may be characterized by a known client function 400, 410 describing the performance or utility 412 of the client 102 as a function of the assigned rate 411. One example of such a function 400, 410 is a rate-distortion function (for example, in the context of an audio codec such a function may map the rate to e.g. the MUSHRA performance). The performance function (notably the client utility function) 400, 410 is typically client-specific. Furthermore, the performance function 400, 410 may change over time depending on the content type, the playback time and/or, for example, the listening conditions. The different CDNs 100, 700 are typically operated in an uncoordinated manner. Hence, there may be no (explicit) communication taking place between the servers 101, 701 of the different CDNs 100, 700. Furthermore, the clients 102 may not be communicating with one another.

The goal of the overall optimization scheme may be to provide the best possible average experience for all clients 102, subject to:
  one or more server and/or resource constraints (e.g., the average rate per client may be constrained in each CDN 100, 700); and/or
  channel capacity constraints specific to each client 102.

Such an optimization scheme may be formulated as a sharing problem. From the point of view of a client 102, the problem at hand is to find the optimal way of using the available network resources. On the other hand, the servers 101 will facilitate cooperation of the clients 102, thereby enabling an equilibrium to be achieved. The optimization problem can be solved by means of message passing in a distributed setting. The overall optimization problem may be subdivided into partial problems that can be solved by clients 102 in an independent manner. In particular, an iterative solution that comprises exchange of messages between servers 101, 701 and clients 102 can be provided, as outlined above.

As illustrated in FIG. 7c, each server 101, 701 sends a message with individual server metadata 121 to each client 102 that the respective server 101, 701 is connected to. The server metadata 121 is specific to each client 102. The derivation of the server metadata 121 is a consequence of the particular distributed optimization method, e.g. as the one described above. This optimization method may be computationally light and may scale efficiently with the number N of connected clients 102. A client 102 provides an update to a server 101, 701 that is derived based on its own objective (notably based on its client utility function 410) and using the message received from the server 101, 701.

In practice the granularity of the resource (e.g. the bit-rate) and/or the quality of different available versions of content may be limited. This issue may be addressed by quantizing the determined resources (notably the resource requests and/or the allocated resources) in accordance to the available granularity. Hence, the optimization scheme may be solved for the continuous case, and the determined solution may be quantized. In particular, a client 102 may be adapted to determine a (continuous) resource request $r_n$ as outlined in the present document. The resource request $r_n$ may then be projected to one of the discrete quantities of the resource $s_n$ which are available. In particular, the discrete resource quantity $s_n$ which is closest to the determined (continuous) resource request $r_n$ may be selected and may be provided to the server 101. On the other hand, the operations at the server 101, 701 may be performed in a continuous manner.

As outlined above, a client 102 may request content from a server 101 based on the (converged) side or control information exchanged between the client 102 and the server 101, notably based on r*, which is the converged allocated quantity of the resource, e.g. $z_n^{(k)}$ and/or $u_n^{(k)}$ after convergence. This side or control information may be used to improve the client control policy, i.e. the policy which the client 102 uses to manage the streaming, the buffering and the rendering of media data 103.

In a typical HTTP-based adaptive streaming scenario, there are several versions (or quality levels) of media content, which are encoded at different bit-rates and which exhibit different quality. The available bandwidth of the data connection from the server 101 to the client 102 is typically time variable and it is up to the client's control policy to select an appropriate quality version or quality level of the content. The client's control policy may attempt to maximize its client utility function 410 (e.g. maximize the quality), subject to the constraint that no buffer underrun is allowed. Given the available bandwidth of the data connection and a constant playout rate, there is typically a trade-off between the playout quality and the average fullness of the buffer. This is due to the fact that downloading a higher quality version of the content would require more downloading time (at an unchanged bandwidth of the data connection). Furthermore, one or more other types of constraints may be taken into account within the client's control policy. For example, it may not be desirable to toggle between different quality versions of content, as this would result in an instable playout quality.

The client control policy may be configured to estimate the available throughput of a network, by means of an explicit measurement of the download speed and/or by observing the state of the buffer of the client 102. By way of example, if it is observed that the buffer is filling up, then this is an indication that the requested data-rate is too high. On the other hand, if it is observed that the buffer is getting empty, then this may indicate that the requested rate is too low.

A streaming process may be performed on a per segment basis, wherein the streamed content is split into relatively short segments. The control policy of a client 102 may be configured to adapt the quality version or quality level of content to be streamed for each of the segments.

Figure 8A:
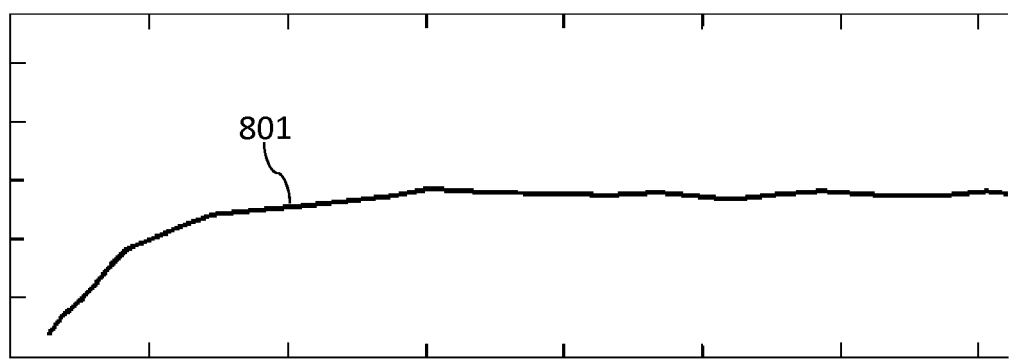
FIG. 8a shows example parameters of a control policy of a client without using a message passing scheme.
Figure 8A:
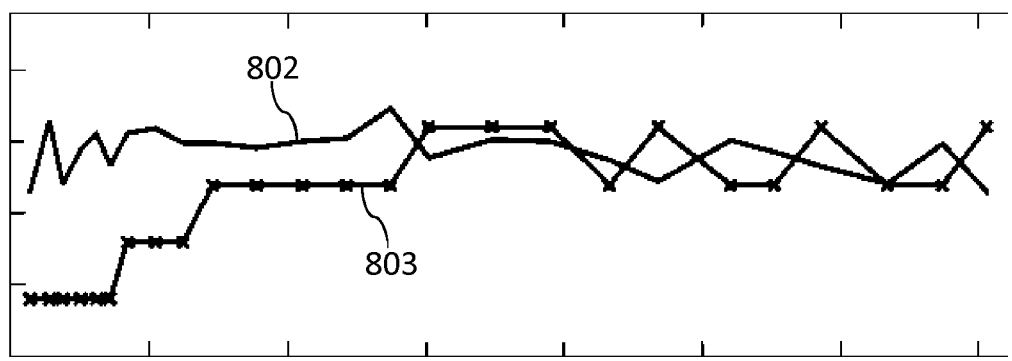

An example of the operation of the client control policy is shown in FIG. 8a. In particular, FIG. 8a shows the fullness level 801 of the playout buffer as a function of time. Furthermore, FIG. 8a illustrates the observed throughput 802 and the selected quality level 803 of the downloaded segments. It can be seen that subsequent to a transient phase, the control policy is directed at matching the available throughput 802 by selecting quality levels 803 corresponding to bit-rates that are in line with the available throughput 802. The transient phase is relatively long. Furthermore, the buffer fullness level 801 is relatively high. In addition, the selection of a quality level 803 is quite erratic.

Figure 8B:
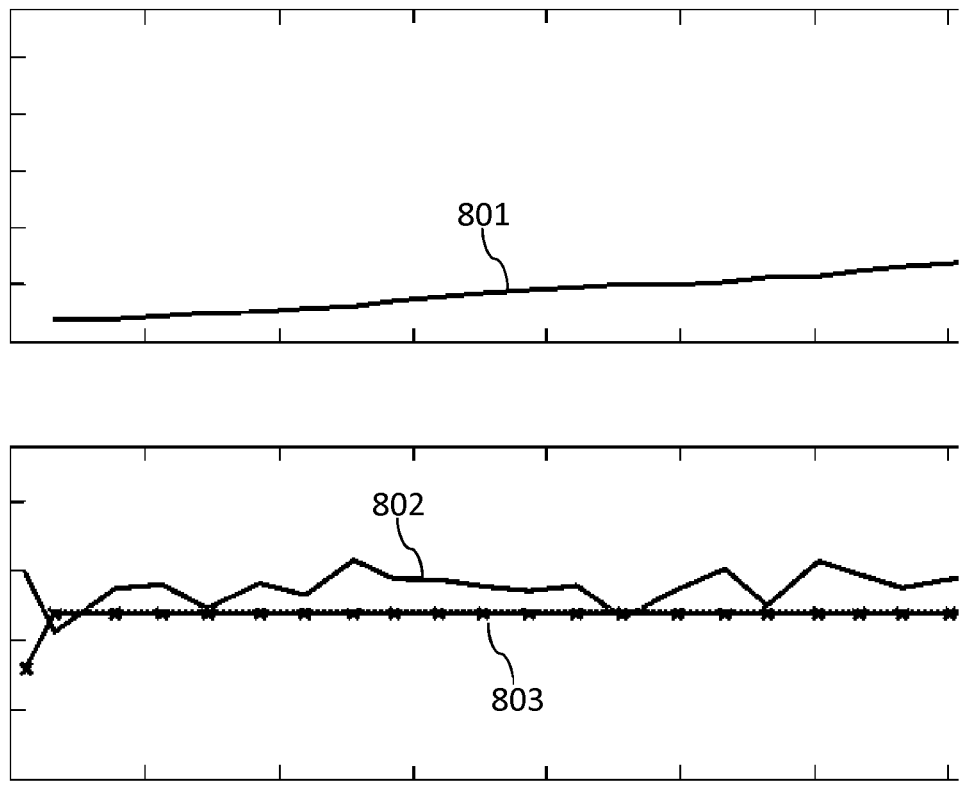
FIG. 8b shows example parameters of a control policy of a client using a message passing scheme.

The side or control information r* may be used to improve performance of a control policy of a client 102. As a matter of fact, the side information provides an indication to the client 102 of the available or allocated rate for the client 102. It may be assumed that all the clients 102 implement the same control policy and are supplied with their respective r* side information. An example of the effect achieved by supplying r* is shown in FIG. 8b. It can be seen that the playout buffer fullness level 801 is lower than in the case of FIG. 8a. In particular, the buffer fullness 801 increases at a much slower rate than in the case of FIG. 8a. Nevertheless, there is no buffer underrun, such that a smooth playout can be ensured. Furthermore, FIG. 8b shows the quality level 803 of the downloaded segments and the observed throughput 802. It can be seen that the transient phase has been shortened. This is due to the fact that the knowledge of the allocated rate r* enables the client 102 to apply a less conservative policy (because the client 102 may assume that a rebuffering event is unlikely, in view of that fact that the value of r* should correspond to the observed throughput 802). Furthermore, the playout policy may result in a more stable selection of the quality level 803, since instances with an overly high rate may be avoided, and since the policy may accept an increased risk in the event that the observed throughput 802 decreases.

If the side information r* is temporarily not available the client policy may operate without it by performing local optimization of QoE subject to a buffer underrun prevention penalty. However, once the side information r* is established, the client control policy may be conditioned based on the side information. The established side information r* may be deemed obsolete after some predefined time interval and the client may revert to a local optimization strategy. The side information r* may be established periodically, notably with a frequency which ensures that the updates of the side information r* are provided with sufficient time resolution.

In other words, the message passing process which is described in the present document may be repeated with a certain frequency f=1/T, with f being 0.01 Hz, 0.05 Hz, 0.1 Hz, 1 Hz or more. Hence, updated side information r* may be provided with the frequency f. A client 102 or client agent may assume that side information which has been established at a particular time instant is valid for a validity period (which may be equal to or greater than T). If no updated side information is received at the end of the validity period, the client 102 or client agent may modify its client control policy by switching to a local optimization of the QoE (e.g. without taking into account an allocated quantity of the resource) for requesting content from the one or more servers 101. On the other hand, the updated side information may be taken into account, if it is received within the validity period and/or as soon as it is received. By doing this, a stable operation of a client 102 may be achieved.

It should be noted that the schemes which are described in the present document may be integrated with MPEG DASH, notably within the interface of server and network assisted DASH (SAND) by attaching the dynamic metadata to the messages being sent (see ISO/IEC JTC 1/SC 29).

Hence, in the present document a method for establishing side or control information for client streaming control policies is described. The side information is established by using an iterative message passing process, wherein the message passing process occurs between server side nodes and client nodes. The process generates convergence events, when the side information is established. The side information may be used for adaptation of client control policies.

In the present document a method which is based on an Alternating Direction Method of Multipliers (ADMM) scheme is described for solving the overall resource allocation problem. It should be noted that other distributed optimization algorithms can be used for solving the overall resource allocation problem. In general terms, the overall resource allocation problem may be solved by
  decomposing the global optimization problem into partial optimization problems (e.g., optimization problems that can be solved on the clients 102 and on the server 101, respectively);
  performing an iterative message passing procedure; and
  generating convergence events, when the side information is established.

Once the side information is established, it may be used to adapt the client control policy. The client control policy may, for example, govern the process of requesting content at a specific bitrate.

The convergence event may be generated e.g. in the following ways:
  the convergence event may be determined by each client 102 by observation of the convergence of the residual term in the client's optimization problem;
  the convergence event may be achieved by using a fixed number of message passing iterations; and/or
  the convergence event may be indicated by the server side node by tagging the outgoing server messages and therefore triggering the side information update event in the clients.

A client may identify the convergence event when its available side information is deemed to be obsolete, by observing:
  a lack of incoming messages from the server side within some predefined time window;
  a lack of convergence of its residual;
  a predefined time interval measured on the client side; and/or
  a received tagged server side message.

It should be noted that the server side metadata exchange agent does not need to be co-located with the server 101 which stores the content. The distributed optimization scheme may involve an agent that operates on the server side and that participates in the message exchange process with all the connected clients 102. In the iterative optimization scheme that is described in the present document, the agent may be configured to collect the resource requests from the clients 102 and to determine the resource allocations. Even though the agent is typically located on the server side, the actual network node does not need to be co-located with the server 101 that stores and provides the content. For example, the node or agent participating in the metadata exchange may be located at a deeper or higher level of the network 100, 700.

It should be noted that the schemes described herein typically assume servers 101 operating in a pull mode, where a client 102 requests the content (as opposed to the push mode, where the server 101 actively pushes data to the clients 102).

In view of a stable and/or fast convergence, the updates of the iterative message passing procedure are preferably performed in a synchronous manner In particular, the server 101 may be configured to issue an update (i.e. server metadata 121) to the connected clients 102 only after receiving all messages (i.e. client metadata 122) from the clients 102. On the other hand, partial barrier schemes may be applied to the processing of the server 101, in order to perform asynchronous operation.

Figure 9A:
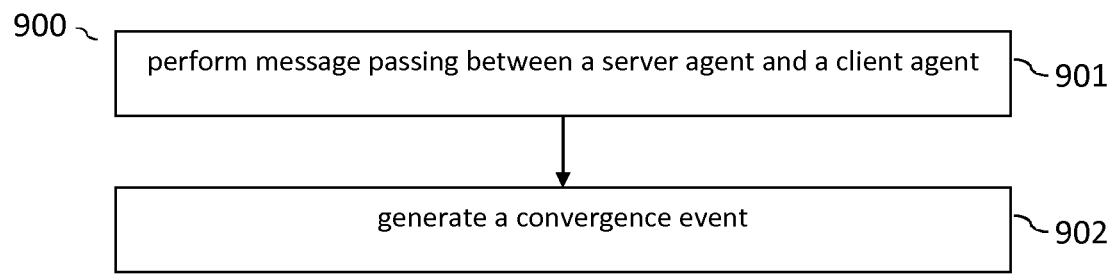
FIGS. 9a to 9c show example flow charts of methods for establishing control information for streaming data within a content delivery network.

FIG. 9a shows a flow chart of an example method 900 for establishing control information for a control policy of a client 102 for streaming data 103, notably media, such as video and/or audio data, from at least one server 101, 701. The control information may be used by the client 102 to request data 103 from the at least one server 101, 701. The client 102 may e.g. comprise a smartphone, a computer, a TV set, etc.

The method 900 comprises performing 901 a message passing process between a server agent of the server 101, 701 and a client agent of the client 102, in order to iteratively establish control information. The server agent may be co-located with or separate from the server 101, 701. In a similar manner the client agent may be co-located with or separate from the client 102. In the context of the message passing process, the server agent may generate server metadata 121 based on client metadata 122 received from the client agent. Furthermore, the client agent may generate client metadata 122 based on the server metadata 121 received from the server agent. This iterative exchange of messages and/or metadata may be repeated to establish control information for the control policy that is to be used by the client 102 for streaming data 103 from the server 101, 701.

Furthermore, the method 900 comprises generating 902 a convergence event for the message passing process to indicate that the control information has been established. As a result of this, the client 102 is enabled to request data 103 from the server 101, 701 based on iteratively established control information (which is also referred to herein as side information). By doing this, optimized content distribution may be performed within a content delivery network 100, 700.

Figure 9B:
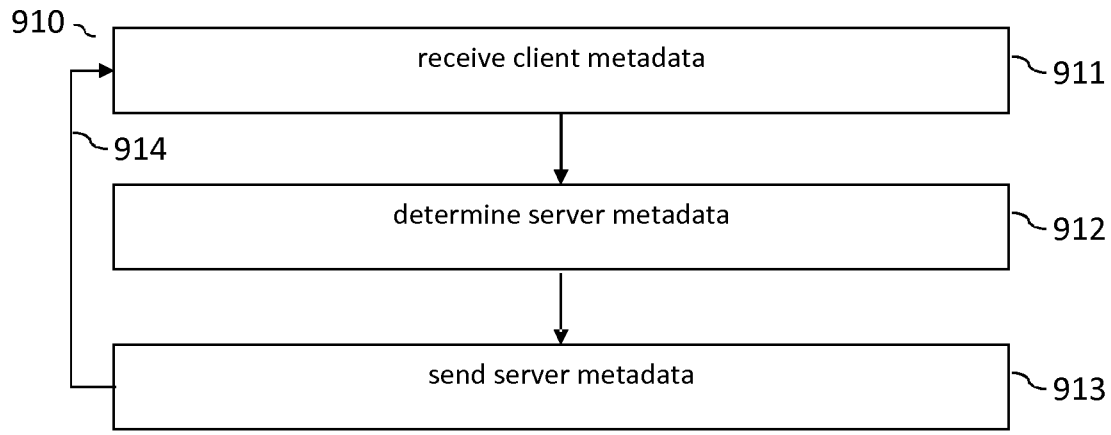

FIG. 9b shows a flow chart of an example method 910 for establishing control information for a control policy of at least one client 102 for streaming data 103 from a server 101, 701. The method 910 may be performed by the server agent of the server 101, 701, e.g. in the context of method 900.

The method 910 comprises receiving 911 client metadata 122, wherein the client metadata 122 may be received from a client agent of the client 102. The client metadata 122 may be indicative of a requested quantity of a resource 411 (e.g. of a requested bit-rate) which is requested by the at least one client 102 for streaming data 103 from the server 101, 701. In particular, different sets of client metadata 122 may be received 911 from a plurality of client agents for a plurality of clients 102, wherein the plurality of clients 102 may be competing for a limited total quantity of the resource 411.

Furthermore, the method 910 comprises determining 912 server metadata 121 based on the received client metadata 122 (from the one or more client agents). The server metadata 121 may be indicative of an allocated quantity of the resource 411 allocated to the at least one client 102 for streaming data 103 from the server 101, 701. In particular, different sets of server metadata 121 may be determined 912 for the plurality of clients 102 (notably one set of server metadata 121 for each client 102).

In addition, the method 910 comprises sending 913 the server metadata 121, the server metadata 121 is typically sent to the client agent of a client 102. In particular, individual server metadata 121 may be sent to each of the plurality of client agents for the plurality of clients 102.

The method 910 comprises repeating 914 the receiving 911, the determining 912 and the sending 913 steps until occurrence of a convergence event. The repeating 914 may be performed in the context of a message passing process between the server agent and the one or more client agents. The convergence event may indicate that control information for the control policy of the at least one client 102 for streaming data 103 from the server 101, 701 has been established based on the iterative receiving 911 of client metadata 122 and sending 913 of server metadata 121. The established control information may then be used by the client 102 for requesting data 103 from the server 101, 701. By performing method 910, optimized content distribution may be performed within a content delivery network 100, 700.

Figure 9C:
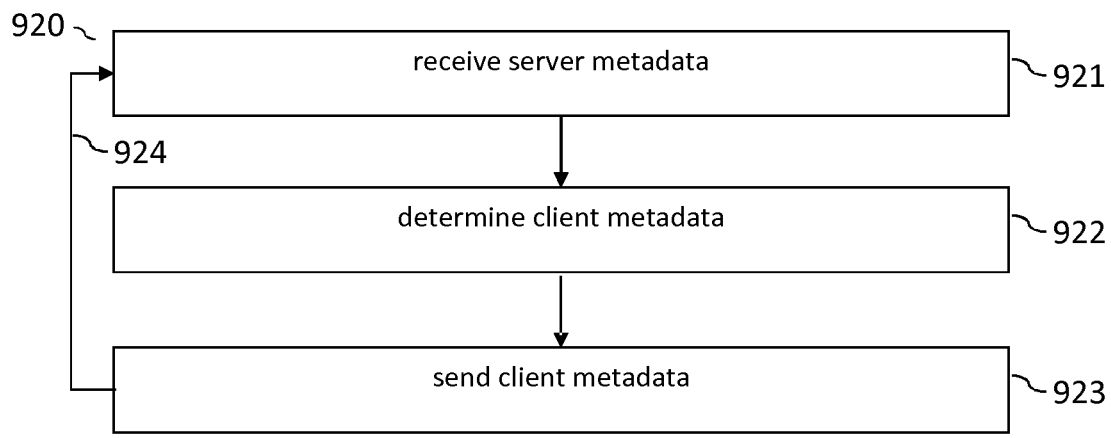

FIG. 9c shows a flow chart of an example method 920 for establishing control information for a control policy of a client 102 for streaming data 103 from at least one server 101, 701. The method 920 may be performed by a client agent of the client 102.

The method 920 comprises receiving 921 server metadata 121. The server metadata 121 may be received by the server agent of the at least one server 101, 701. The client 102 may be configured to stream data 103 for an overall media content that is to be rendered by the client 102 from a plurality of different servers 101, 701. In such a case, server metadata 121 may be received from each one of the plurality of servers 101, 701. The server metadata 121 may be indicative of an allocated quantity of a resource 411 allocated to the client 102 for streaming data 103 from the respective server 101, 701.

Furthermore, the method 920 comprises determining 922 client metadata 122 based on the server metadata 121 (from the one or more servers 101, 701 or server agents). The client metadata 122 may be indicative of a requested quantity of the resource 411 requested by the client 102 for streaming data 103 from the at least one server 101, 701. A set of client metadata 122 may be generated for each one of the plurality of servers 101, 701.

In addition, the method 920 comprises sending 923 the client metadata 122 (to the one or more servers 101, 701 or server agents).

The method 920 repeats 924 the receiving 921, the determining 922 and the sending 923 steps until occurrence of a convergence event (e.g. in the context of a message passing process). The convergence event may indicate that control information for the control policy of the client 102 for streaming data 103 from the at least one server 101, 701 has been established based on the iterative receiving 921 of server metadata 121 and sending 923 of client metadata 122. The established control information may then be used by the client 102 for requesting data 103 from the one or more servers 101, 701. By performing method 920, optimized content distribution may be performed within a content delivery network 100, 700.

Various aspects of the present invention may be appreciated from the following enumerated example embodiments (EEs):

EE 1) A method (900) for establishing control information for a control policy of a client (102) for streaming data (103) from at least one server (101, 701); wherein the method (900) comprises,
    performing (901) a message passing process between a server agent of the server (101, 701) and a client agent of the client (102), in order to iteratively establish control information; and
    generating (902) a convergence event for the message passing process to indicate that the control information has been established.

EE 2) The method (900) of EE 1, wherein performing (901) the message passing process comprises, within a given iteration,
    sending server metadata (121) from the server agent to the client agent; wherein the server metadata (121) at the given iteration depends on client metadata (122) sent from the client agent to the server agent at a previous iteration; and sending client metadata (122) from the client agent to the server agent; wherein the client metadata (122) at the given iteration depends on the server metadata (121) sent from the server agent to the client agent at the given iteration.

EE 3) The method (900) of EE 2, wherein
the method (900) comprises determining client metadata (122) based on a client utility function (410); and
the client utility function (410) indicates a utility (412) for the client (102) of the data (103) received by the client (102), as a function of the quantity of a resource (411) that has been allocated to the client (102) for streaming data (103).

EE 4) The method (900) of EE 3, wherein the client utility function (410) is
indicative of and/or dependent on a perceptual quality of streamed media data (103) rendered by the client (102); and/or
indicative of and/or dependent on a signal-to-noise ratio of streamed data (103) received and/or rendered by the client (102); and/or
dependent on a rendering mode of the client (102); and/or
dependent on a rendering environment of the client (102); and/or
dependent on a type of the client (102); and/or
time-variant.

EE 5) The method (900) of any of EEs 2 to 4, wherein
the method (900) comprises determining a requested quantity of the resource (411), requested by the client (102), based on the client utility function (400, 410); and
the client metadata (122) is indicative of a requested quantity of the resource (411).

EE 6) The method (900) of any of EEs 2 to 5, wherein
the server metadata (121) is indicative of an allocated quantity of the resource (411) which is allocated to the client (102) for streaming data (103); and
the method (900) comprises determining a requested quantity of the resource (411), requested by the client (102) in dependence of the allocated quantity of the resource (411).

EE 7) The method (900) of EE 6 referring back to EE 5, wherein the requested quantity of the resource (411) is determined based on, notably by reducing or minimizing, a cost function which comprises
a first term indicative of a deviation of the requested quantity of the resource (411) from the allocated quantity of the resource (411); and
a second term comprising a complement of the client utility function (410).

EE 8) The method (900) of EE 7, wherein
the cost function comprises a weighted sum of the first term and the second term; and/or
the first term is dependent on an absolute or a squared deviation of the requested quantity of the resource (411) from the allocated quantity of the resource (411).

EE 9) The method (900) of EE 2 to 8, wherein
the client metadata (122) is indicative of a requested quantity of the resource (411), requested by the client (102); and
the allocated quantity of the resource (411) is determined based on the requested quantity of the resource (411).

EE 10) The method (900) of any of EEs 2 to 9, wherein the method (900) comprises determining the server metadata (121) in dependency of a total quantity of a resource (411) to be allocated to a plurality of clients (102) for streaming data (103).

EE 11) The method (900) of EE 10, wherein
the client (102) is a first client (102) of the plurality of clients (102);
the method (900) comprises determining an allocated quantity of the resource (411), which is allocated to the first client (102) for streaming data (103), based on the total quantity of the resource (411); and
the server metadata (121) is indicative of the allocated quantity of the resource (411) which is allocated to the first client (102) for streaming data (103).

EE 12) The method (900) of EE 11, wherein
the method (900) comprises, receiving client metadata (122) from the plurality of clients (102) competing for the total quantity of the resource (411); and
the allocated quantity of the resource (411) for the first client (102) is determined based on the requested quantity of the resource (411) from each of the plurality of clients (102).

EE 13) The method (900) of any previous EEs, wherein the control information is indicative of or comprises a quantity of a resource (411) that has been allocated to the client (102) for streaming data (103).

EE 14) The method (900) of EE 13, wherein the resource (411) comprises one or more of,
a bit-rate for streaming data (103); and/or
a processing capacity of the server (101) for providing data (103); and/or
a bandwidth of a transmission network (601) between the server (101) and the client (102).

EE 15) The method (900) of any previous EEs, wherein generating (902) the convergence event comprises,
determining that a pre-determined maximum number of iterations of the message passing process has been reached; and/or
determining that a change of the control information between two successive iterations of the message passing process is equal to or smaller than a pre-determined change-threshold; and/or
determining that the client agent and/or the server agent have sent an indication for terminating the message passing process.

EE 16) The method (900) of any previous EEs, wherein the method (900) comprises,
generating a request for data (103) based on the established control information; and/or
managing a buffer of the client (103) for buffering data (103) based on the established control information; and/or
selecting a quality level (803) out of a plurality of different quality levels (803) of content to be streamed.

EE 17) The method (900) of any previous EEs, wherein
the method (900) comprises performing a pairwise message passing process between the server agent of the server (101, 701) and client agents of a plurality of clients (102), in order to iteratively establish control information for each of the plurality of clients (102); and
the plurality of clients (102) compete for a total quantity of a resource (411) available for streaming data (103) from the server (102).

EE 18) The method (900) of any previous EEs, wherein the method (900) comprises
performing a pairwise message passing process between server agents of a plurality of servers (101, 701) and the client agent of the client (102), in order to iteratively establish control information for control policies of the client (102) for streaming data (103) from each of the plurality of servers (101, 701); and streaming different fractions of an overall media stream from the different servers (101, 701) based on the established control information for the different servers (101, 701), respectively.

EE 19) A method (910) for establishing control information for a control policy of at least one client (102) for streaming data (103) from a server (101, 701); wherein the method (910) comprises, receiving (911) client metadata (122); wherein the client metadata (122) is indicative of a requested quantity of a resource (411) requested by the at least one client (102) for streaming data (103) from the server (101, 701);

determining (912) server metadata (121) based on the received client metadata (122); wherein the server metadata (121) is indicative of an allocated quantity of the resource (411) allocated to the at least one client (102) for streaming data (103) from the server (101, 701);

sending (913) the server metadata (121); and repeating (914) the receiving (911), determining (912) and sending (913) steps until occurrence of a convergence event; wherein the convergence event indicates that control information for the control policy of the at least one client (102) for streaming data (103) from the server (101, 701) has been established based on the iterative receiving (911) of client metadata (122) and sending (913) of server metadata (121).

EE 20) A method (920) for establishing control information for a control policy of a client (102) for streaming data (103) from at least one server (101, 701); wherein the method (920) comprises, receiving (921) server metadata (121); wherein the server metadata (121) is indicative of an allocated quantity of a resource (411) allocated to the client (102) for streaming data (103) from the at least one server (101, 701);

determining (922) client metadata (122) based on the server metadata (121); wherein the client metadata (122) is indicative of a requested quantity of the resource (411) requested by the client (102) for streaming data (103) from the at least one server (101, 701);

sending (923) the client metadata (122); and repeating (924) the receiving (921), determining (922) and sending (923) steps until occurrence of a convergence event; wherein the convergence event indicates that control information for the control policy of the client (102) for streaming data (103) from the at least one server (101, 701) has been established based on the iterative receiving (921) of server metadata (121) and sending (923) of client metadata (122).

EE 21) The method (920) of EE 20, wherein the method (920) comprises repeatedly determining updated control information using the receiving, determining, sending and repeating steps.

EE 22) The method (920) of any of EEs 20 to 21, wherein the control information is established at a first time instant;

the control information exhibits a validity period starting from the first time instant;

the method (920) comprises, determining the control policy for streaming data (103) based on the control information during the validity period of the control information; and the method (920) comprises, applying a control policy for streaming data (103) which is independent of the control information, subsequent to the validity period of the control information.

EE 23) A system (100, 700) for delivering content; wherein the system (100, 700) comprises at least one server (101, 701) configured to provide data (103) for streaming content to one or more clients (102);

at least one client (102) configured to request data (103) for streaming content from the at least one server (101, 701);

a server agent for the at least one server (101, 701) and a client agent for the at least one client (102); wherein the server agent and the client agent are configured to perform a message passing process between the server agent and the client agent, in order to iteratively establish control information for a control policy of the at least one client (102) for streaming data (103) from the at least one server (101, 701); and generate a convergence event for the message passing process to indicate that the control information has been established.

EE 24) A server agent for a server (101, 701) of a content delivery network (100, 700); wherein the server agent is configured to receive client metadata (122); wherein the client metadata (122) is indicative of a requested quantity of a resource (411) requested by a client (102) for streaming data (103) from the server (101, 701);

determine server metadata (121) based on the received client metadata (122); wherein the server metadata (121) is indicative of an allocated quantity of the resource (411) allocated to the client (102) for streaming data (103) from the server (101, 701);

send the server metadata (121); and repeat receiving, determining and sending until occurrence of a convergence event; wherein the convergence event indicates that control information for a control policy of the client (102) for streaming data (103) from the server (101, 701) has been established based on the iterative receiving of client metadata (122) and sending of server metadata (121).

EE 25) A client agent for a client (102) of a content delivery network (100, 700); wherein the client agent is configured to receive server metadata (121); wherein the server metadata (121) is indicative of an allocated quantity of a resource (411) allocated to the client (102) for streaming data (103) from a server (101, 701);

determine client metadata (122) based on the server metadata (121); wherein the client metadata (122) is indicative of a requested quantity of the resource (411) requested by the client (102) for streaming data (103) from the server (101, 701);

send the client metadata (122); and repeat receiving, determining and sending until occurrence of a convergence event; wherein the convergence event indicates that control information for a control policy of the client (102) for streaming data (103) from the server (101, 701) has been established based on the iterative receiving of server metadata (121) and sending of client metadata (122).

The methods and systems described in the present document may be implemented as software, firmware and/or hardware. Certain components may e.g. be implemented as software running on a digital signal processor or microprocessor. Other components may e.g. be implemented as hardware and/or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

The invention claimed is:

1. A method for establishing control information for a control policy of a client for streaming data from a server to the client; wherein the method comprises,
  performing a message passing process between a server agent of the server and a client agent of the client in order to iteratively establish control information; and
  generating a convergence event for the message passing process to indicate that the control information has been established;
  wherein performing the message passing process comprises, within a given iteration,
  sending server metadata from the server agent to the client agent; wherein the server metadata at the given iteration depends on client metadata sent from the client agent to the server agent, at a given iteration; wherein the server metadata is determined, by the server agent, in dependency of a total quantity of the resource to be allocated to a plurality of clients for streaming data by solving a minimization problem based on a server cost function, and wherein the server metadata is indicative of the allocated quantity of the resource which has been allocated to the client for streaming the data; and
  sending client metadata from the client agent to the server agent; wherein the client metadata at the given iteration depends on the server metadata sent from the server agent to the client agent at the previous iteration, wherein the client metadata are determined, by the client agent, based on a client utility function; wherein the client utility function indicates a utility for the client of the data received by the client, as a function of a quantity of the resource that has been allocated to the client for streaming the data; a requested quantity of the resource, requested by the client, is determined, by the client agent, by minimizing a cost function which comprises
  a first term being dependent on an absolute or a squared deviation of the requested quantity of the resource from the allocated quantity of the resource;
  a second term comprising a complement of the client utility function; and
  a weighted sum of the first term and the second term; and wherein the client metadata is indicative of the determined requested quantity of the resource.

2. The method of claim 1, wherein
  the allocated quantity of the resource is determined based on the requested quantity of the resource.

3. The method of claim 1, wherein the control information is indicative of or comprises a quantity of a resource that has been allocated to the client for streaming the data.

4. The method of claim 1, wherein the method comprises, performing a pairwise message passing process between the server agent of the server and client agents of the plurality of clients, in order to iteratively establish control information for each of the plurality of clients; and the plurality of clients compete for the total quantity of the resource available for streaming the data from the server.

5. The method of claim 1, wherein the method comprises, performing a pairwise message passing process between server agents of a plurality of servers and the client agent of the client, in order to iteratively establish control information for control policies of the client for streaming the data from each of the plurality of servers, wherein the plurality of servers include the server; and
  streaming different fractions of an overall media stream from the different servers based on the established control information for the different servers, respectively.

6. A method for establishing control information for a control policy of a client for streaming data from a server to the client; the method comprises,
  receiving, by a server agent, client metadata; wherein the client metadata is indicative of a requested quantity of a resource requested by the client for streaming the data from the server;
  determining, by the server agent, server metadata based on the received client metadata and in dependency of a total quantity of the resource to be allocated to a plurality of clients for streaming data by solving a minimization problem based on a server cost function; the server metadata is indicative of an allocated quantity of the resource allocated to the client for streaming the data from the server;
  sending, by the server agent, the server metadata; and
  repeating the receiving, determining and sending steps until occurrence of a convergence event; the convergence event indicates that control information for the control policy of the client for streaming the data from the server has been established based on the iterative receiving of client metadata and sending of server metadata.

7. A method for establishing control information for a control policy of a client for streaming data from a server to the client; the method comprises,
  receiving, by a client agent, server metadata; the server metadata is indicative of an allocated quantity of a resource allocated to the client for streaming the data from the server;
  determining, by the client agent, client metadata based on the server metadata including determining a requested quantity of the resource by minimizing a cost function which comprises
    i. a first term being dependent on an absolute or a squared deviation of the requested quantity of the resource from the allocated quantity of the resource; and
    ii. a second term comprising a complement of a client utility function, wherein the client utility function indicates a utility for the client of the data received by the client, as a function of a quantity of the resource that has been allocated to the client for streaming the data;
    iii. a weighted sum of the first term and the second term;
  wherein the client metadata is indicative of the requested quantity of the resource
  requested by the client for streaming the data from the server;
  sending, by the client agent, the client metadata; and
  repeating the receiving, determining and sending steps until occurrence of a convergence event; wherein the convergence event indicates that control information for the control policy of the client for streaming the data from the server has been established based on the iterative receiving of server metadata and sending of client metadata.

8. A non-transitory computer-readable storage medium storing one or more programs configured to be executed by one or more processors of a server of a content delivery network, the one or more programs including instructions for:

receiving client metadata; wherein the client metadata is indicative of a requested quantity of a resource requested by a client for streaming the data from the server;

determining server metadata based on the received client metadata and in dependency of a total quantity of the resource to be allocated to a plurality of clients for streaming data by solving a minimization problem based on a server cost function; wherein the server metadata is indicative of an allocated quantity of the resource allocated to the client for streaming the data from the server;

sending the server metadata; and repeating receiving, determining and sending until occurrence of a convergence event; wherein the convergence event indicates that control information for a control policy of the client for streaming the data from the server has been established based on the iterative receiving of client metadata and sending of server metadata.

9. A non-transitory computer-readable storage medium storing one or more programs configured to be executed by one or more processors of a client device of a content delivery network, the one or more programs including instructions for:

receiving server metadata; wherein the server metadata is indicative of an allocated quantity of a resource allocated to the client device for streaming the data from a server;

determining client metadata based on the server metadata including determining a requested quantity of the resource by minimizing a cost function which comprises i. a first term being dependent on an absolute or a squared deviation of the requested quantity of the resource from the allocated quantity of the resource; and ii. a second term comprising a complement of a client utility function, wherein the client utility function indicates a utility for the client device of the data received by the client device, as a function of a quantity of the resource that has been allocated to the client device for streaming the data;

iii. a weighted sum of the first term and the second term wherein the client metadata is indicative of the requested quantity of the resource requested by the client device for streaming the data from the server;

sending the client metadata; and repeating receiving, determining and sending until occurrence of a convergence event; wherein the convergence event indicates that control information for a control policy of the client device for streaming the data from the server has been established based on the iterative receiving of server metadata and sending of client metadata.

* * * * *